(12) United States Patent
Rodriguez

(10) Patent No.: US 12,726,479 B1
(45) **Date of Patent: *Sep. 1, 2026**

(54) METHODS AND SYSTEMS FOR ENHANCING DETECTION OF FRAUDULENT AUTHENTICATION DATA

(71) Applicant: Daon Technology, Douglas (IM)

(72) Inventor: Raphael A. Rodriguez, Marco Island, FL (US)

(73) Assignee: Daon Technology, Douglas (IM)

( * ) Notice: Subject to any disclaimer, the term of this patent is extended or adjusted under 35 U.S.C. 154(b) by 0 days.

This patent is subject to a terminal disclaimer.

(21) Appl. No.: 19/634,349

(22) Filed: Mar. 31, 2026

Related U.S. Application Data

(63) Continuation of application No. 19/414,773, filed on Dec. 10, 2025, now Pat. No. 12,647,416.

(51) Int. Cl.
*H04L 9/40* (2022.01)

(52) U.S. Cl.
CPC .................................. *H04L 63/0861* (2013.01)

(58) Field of Classification Search
CPC .................................................... H04L 63/0861
See application file for complete search history.

(56) References Cited

U.S. PATENT DOCUMENTS 12,190,564 B2 1/2025 Ji et al.
12,204,994 B2 1/2025 Lienhard et al.
12,307,826 B1 5/2025 Rodriguez
12,413,402 B1 9/2025 Rodriguez
12,450,952 B1 10/2025 Rodriguez
12,525,224 B2 1/2026 Altaf et al.
12,634,322 B1 * 5/2026 Bhardwaj ........... H04L 63/1425
2012/0219176 A1 8/2012 Guan et al.
2014/0333413 A1 11/2014 Kursun
(Continued)

FOREIGN PATENT DOCUMENTS

WO WO 2024/226570 10/2002
WO WO 2025/002636 1/2025

OTHER PUBLICATIONS

J. Preskill, "Quantum computing in the NISQ era and beyond," Quantum, vol. 2, p. 79, Aug. 2023.
(Continued)

*Primary Examiner* — Izunna Okeke
(74) *Attorney, Agent, or Firm* — Kevin McDermott, Esq.

(57) ABSTRACT

A method for enhancing detection of fraudulent authentication data is provided that includes obtaining within a window of time from one or more sensors a plurality of signals. Each signal includes data for a biometric modality of a person. Moreover, the method includes determining whether the biometric modality data in the obtained signals was captured contemporaneously. If so, a feature vector is computed for the biometric modality data in each of the plurality of signals, each feature vector is encoded into a corresponding qubit register using an encoding algorithm, and a multi-qubit entangled state is generated from the qubit registers. An entanglement indicator value is also generated for the multi-qubit entangled state and the entanglement indicator value is compared against a threshold value. When the entanglement indicator value satisfies the threshold value, the obtained biometric modality data is determined to be of a live person.

17 Claims, 7 Drawing Sheets

(56) References Cited

U.S. PATENT DOCUMENTS

| | | | |
|---|---|---|---|
| 2019/0052460 | A1 | 2/2019 | Fu |
| 2020/0175290 | A1 | 6/2020 | Raja et al. |
| 2020/0218885 | A1 | 7/2020 | Budhrani et al. |
| 2021/0117529 | A1 | 4/2021 | Zamora Martinez et al. |
| 2021/0203493 | A1 | 7/2021 | Chen |
| 2022/0121884 | A1 | 4/2022 | Zadeh et al. |
| 2022/0272084 | A1 | 8/2022 | Hyatt |
| 2022/0405362 | A1 | 12/2022 | Yanamala et al. |
| 2023/0126764 | A1 | 4/2023 | Ibrahim et al. |
| 2023/0206104 | A1 | 6/2023 | Rab et al. |
| 2023/0206605 | A1 | 6/2023 | Aoki |
| 2023/0308198 | A1 | 9/2023 | Sakai |
| 2024/0119576 | A1 | 4/2024 | Qui et al. |
| 2024/0127395 | A1 | 4/2024 | Nakatsugawa |
| 2024/0177519 | A1 | 5/2024 | Singh et al. |
| 2024/0311670 | A1 | 9/2024 | Senokosov et al. |
| 2024/0406170 | A1 | 12/2024 | Harris et al. |
| 2025/0014388 | A1 | 1/2025 | Venkataraman et al. |
| 2025/0030540 | A1 | 1/2025 | Nix |

OTHER PUBLICATIONS

P. J. Phillips, et al., "The FERET database and evaluation procedure for face recognition algorithms," Image Vis. Comput., vol. 16, No. 5, pp. 295-306, Apr. 1998.

R. Raghavendra, et al., "Detecting morphed face images," IEEE Trans. Inf. Forensics Security, vol. 12, No. 7, pp. 1673-1686, Jul. 2017.

U. Scherhag et al., "Detection of face morphing attacks based on PRNU patterns," J. Electron. Imaging, vol. 28, No. 2, p. 023007, Mar. 2019.

Chaudary et al. "Differential Morph Face Detection Using Discriminitive Wavelet Sub-Bands", Proceedings on the IEEE/CVF CVPR, 2021,pp. 1425-1434 (year: 2021).

Venkatesh et al. "Face Morphing Attack Generation and Detection: A Comprehensive Survey", IEEE Transitions on Technology and Society, vol. 2, No. 3, Sep. 2021.

* cited by examiner

METHODS AND SYSTEMS FOR ENHANCING DETECTION OF FRAUDULENT AUTHENTICATION DATA

CROSS-REFERENCE TO RELATED APPLICATIONS

This is a continuation application of U.S. patent application Ser. No. 19/414,773, filed Dec. 10, 2025, the entire disclosure of which is incorporated herein by reference.

BACKGROUND OF THE INVENTION

This invention relates generally to authentication data, and more particularly, to methods and systems for enhancing detection of fraudulent authentication data.

For high-assurance access in military field operations, zero-trust cloud login environments, highly regulated industries, or decentralized biometric identity wallets, hardware-based privacy and liveness guarantees are paramount. Biometric authentication has become ubiquitous in consumer electronics and in regulated industries such as healthcare and financial services. Face and voice biometric modalities are widely used. Known liveness detection techniques such as challenge-response prompts, texture-analysis of facial images, and voice-pattern consistency checks are widely deployed to guard against spoofing. For example, it is known to use texture-based liveness methods that analyze skin micro-structure under varying illumination and to use multi-spectral reflection analysis to distinguish live tissue from printed or mask-based forgeries. Such approaches typically inspect local contrast, pore patterns, or multi-band reflectance to differentiate genuine users from static attack presentations.

However, it is known that such techniques can be defeated by high-quality deepfakes generated by Generative Adversarial Networks (GAN) such as StyleGAN2-based facial videos that replicate realistic micro-expressions and by ultra-high-fidelity replay devices capable of reproducing fine texture and acoustic details. Moreover, for voice biometric modality data, advanced neural vocoders can synthesize speech with natural prosody and timbral consistency, rendering conventional anti-replay and spectral checks ineffective.

Known techniques for guarding against synthetic identity attacks can involve mapping non-quantum feature vectors into high-dimensional quantum feature spaces and injecting session-unique noise, which enables detecting subtle morphing or deepfake artifacts. Such quantum-enhanced techniques may improve sensitivity to tampering but are fundamentally passive. That is, attackers possessing a valid, noise-injected quantum state can intercept and replay the quantum state to successfully spoof an authenticator to gain unauthorized access to a computer system and data stored therein.

Thus, it would be advantageous and an improvement over the relevant technology to provide a method, an electronic device, and a computer-readable recording medium capable of detecting deepfakes and seemingly valid, noise-injected quantum states to guard against spoofing attacks launched against, for example, military field operations, zero-trust cloud login environments, and highly regulated industries.

BRIEF DESCRIPTION OF THE INVENTION

In one aspect of the present disclosure, a method for enhancing detection of fraudulent authentication data is provided that includes obtaining within a window of time, by an electronic device, from one or more sensors a plurality of signals. Each signal includes data for a same or different biometric modality of a person. The method also includes determining whether the biometric modality data in the obtained signals was captured contemporaneously.

When the biometric modality data was captured contemporaneously, the method includes computing a feature vector for the biometric modality data in each of the plurality of signals, encoding each feature vector into a corresponding qubit register using an encoding algorithm, generating a multi-qubit entangled state from the qubit registers, generating an entanglement indicator value for the multi-qubit entangled state, and comparing the entanglement indicator value against a threshold value. In response to determining the entanglement indicator value satisfies the threshold value, the method includes determining the obtained biometric modality data is of a live person.

In one embodiment of the present disclosure, the encoding algorithm includes an amplitude encoding algorithm, an angle encoding algorithm, or an instantaneous-quantum-polynomial feature algorithm. The encoding algorithms map the encoded feature vectors into qubits. The entanglement indicator value is at least one of a stabilizer-based Bell-state fidelity estimator, a Clauser-Horne-Shimony-Holt parameter, and a negative expectation of an entanglement witness from readout corrected measurement outcomes.

In another embodiment of the present disclosure, the encoding the biometric modality data includes data for different biometric modalities and data for the same biometric modality captured at different times within the window of time. The capture times generated by each of the sensors only increase relative to previous capture times generated by the respective sensor. Additionally, the biometric modality data includes data for the same biometric modality obtained via different sensors.

In yet another embodiment of the present disclosure, each of the one or more sensors is associated with an attested device key pair. The attested device key pair for each sensor is the same or different. The method further includes obtaining, by the electronic device, an electronically signed tuple transmitted via a network from each of the one or more sensors. The electronically signed tuple includes a nonce, an electronic signature, and a time the one signal was captured. The time is bound to the attested device key pair of the respective sensor. The capture times generated by each of the sensors only increase relative to previous capture times generated by the respective sensor.

The method further includes verifying the electronic signature, freshness of the nonce, and the attested status of a time base of each of the one or more sensors. When the electronic signature, freshness of the nonce, and attested statuses are verified, the method includes calculating, from the captured times, a maximum capture time and a minimum capture time, and calculating the window of time as the difference between the maximum and minimum times. When the electronic signature, freshness of the nonce, or the attested status for any one of the one or more sensors fail to be verified, or the window of time exceeds a calibrated maximum duration, the method determines the obtained biometric modality data is fraudulent. The window of time is independent of latencies of the network.

In yet another embodiment of the present disclosure, each of the one or more sensors is associated with a respective attested device key pair. The method further includes periodically recomputing the entanglement indicator value and determining whether the recomputed entanglement indicator value is different than the entanglement indicator value. In response to determining the entanglement indicator value is different, the method includes comparing the recomputed entanglement value against the threshold value. In response to determining the recomputed entanglement value fails to satisfy the threshold value, the method includes determining the biometric modality data is fraudulent and removing the attested device key pair.

The method further includes periodically recomputing the entanglement indicator value and determining whether the recomputed entanglement indicator value is different than the entanglement indicator value. In response to determining the entanglement indicator value is different, the method includes comparing the recomputed entanglement value against the threshold value. In response to determining the recomputed entanglement value fails to satisfy the threshold value, the method includes determining the biometric modality data is fraudulent and removing the attested device key pair.

In yet another embodiment of the present disclosure, the method includes calculating an anomaly score for the biometric modality data represented by each of the plurality of signals, calculating a risk score based on the entanglement indicator value and the anomaly scores, comparing the risk score against a risk score threshold value, and determining whether the obtained biometric modality data is of a live person at least in part on whether the risk score satisfies the risk score threshold value.

In yet another embodiment of the present disclosure, the method further includes inserting at least one of decoy qubits and decoy shots into the qubit registers according to a randomized policy over register positions, time slots, prepared states, and measurement bases. Moreover, the method includes calculating a decoy mismatch rate and comparing the decoy mismatch rate against a mismatch threshold. In response to determining the decoy mismatch rate fails to satisfy the mismatch threshold, the method includes determining the obtained biometric modality data is fraudulent.

In yet another embodiment of the present disclosure, the one or more sensors include a plurality of sensors. When a signal is not obtained from one of the plurality of sensors, the method further includes generating the multi-qubit entangled state using at least one of the qubit registers and an ancilla qubit and comparing the entanglement indicator against a lower threshold value. In response to determining the entanglement indicator value fails to satisfy the lower threshold value, the method includes determining the biometric modality data in the signal from another one of the plurality of sensors is fraudulent.

In yet another embodiment of the present disclosure, the method includes obtaining times at which each one of the one or more sensors captured the respective signal, and calculating the window of time according to the equation $\Delta t = \max\_k \{t\_k\} - \min\_k \{t\_k\}$, where: $\Delta t$ represents a duration of the window of time and t_k represents the time a signal was captured. The capture times generated by each of the sensors only increase relative to previous capture times generated by the respective sensor. {t_k} represents a set of all t_k, max_k represents the maximum time t_k in the set {t_k}, and min_k represents the minimum time t_k in the set {t_k}.

Another aspect of the present disclosure provides a non-transitory computer-readable recording medium in an electronic device for enhancing detection of fraudulent authentication data. The non-transitory computer-readable recording medium stores instructions which when executed by a hardware processor, performs the steps of the methods described above.

In another aspect of the present disclosure, an electronic device for enhancing detection of fraudulent authentication data is provided that includes a processor and a memory configured to store data. The electronic device is associated with a network and the memory is in communication with the processor and has instructions stored thereon. The instructions which, when read and executed by the processor, cause the electronic device to obtain within a window of time from one or more sensors a plurality of signals. Each signal includes data for a same or different biometric modality of a person. The instructions which, when read and executed by the processor, further cause the electronic device to determine whether the biometric modality data in the obtained signals was captured contemporaneously.

When the biometric modality data was captured contemporaneously, the instructions which, when read and executed by the processor, cause the electronic device to compute a feature vector for the biometric modality data in each of the plurality of signals, encode each feature vector into a corresponding qubit register using an encoding algorithm, generate a multi-qubit entangled state from the qubit registers, generate an entanglement indicator value for the multi-qubit entangled state, and compare the entanglement indicator value against a threshold value. In response to determining the entanglement indicator value satisfies the threshold value, the instructions which, when read and executed by the processor, cause the electronic device to determine the biometric modality data is of a live person.

In another embodiment of the present disclosure, wherein the instructions when read and executed by the processor, cause the electronic device to encode the normalized feature vector using at least one of amplitude encoding and angle encoding.

In another embodiment of the present disclosure, the encoding algorithm includes an amplitude encoding algorithm, an angle encoding algorithm, or an instantaneous-quantum-polynomial feature algorithm. The entanglement indicator value includes at least one of a stabilizer-based Bell-state fidelity estimator, a Clauser-Horne-Shimony-Holt statistic, and a negative expectation of an entanglement witness from readout corrected measurement outcomes.

In yet another embodiment of the present disclosure, the biometric modality data includes data for different biometric modalities and data for the same biometric modality captured at different times within the window of time. The capture times generated by each of the sensors only increase relative to previous capture times generated by the respective sensor. The biometric modality data also includes data for the same biometric modality obtained via different channels.

In yet another embodiment of the present disclosure, each of the one or more sensors is associated with an attested device key pair. The attested device key pair for each sensor is the same or different. The instructions when read and executed by the processor, cause the electronic device to obtain an electronically signed tuple transmitted via the network from each of the one or more sensors. The electronically signed tuple includes a nonce, an electronic signature, and a time the one signal was captured. The time being bound to the attested device key pair of the respective sensor.

The instructions when read and executed by the processor, cause the electronic device to verify the electronic signature, freshness of the nonce, and the attested status of a time base of each of the one or more sensors. The capture times generated by each of the sensors only increase relative to previous capture times generated by the respective sensor. The instructions when read and executed by the processor, further cause the electronic device to calculate, from the captured times, a maximum capture time and a minimum capture time, and calculate the window of time as the difference between the maximum and minimum times. When the electronic signature, freshness of the nonce, or the attested status for any one of the one or more sensors fail to be verified, or the window of time exceeds a calibrated maximum duration, the instructions when read and executed by the processor, further cause the electronic device to determine the obtained biometric data is fraudulent. The window of time is computed from the captured times and is independent of latencies of the network.

In yet another embodiment of the present disclosure, each of the one or more sensors is associated with a respective attested device key pair. The instructions when read and executed by the processor, cause the electronic device to periodically recompute the entanglement indicator value and determine whether the recomputed entanglement indicator value is different than the entanglement indicator value. In response to determining the entanglement indicator value is different, the instructions when read and executed by the processor, cause the electronic device to compare the recomputed entanglement value against the threshold value. In response to determining the recomputed entanglement value fails to satisfy the threshold value, the instructions when read and executed by the processor, cause the electronic device to determine the obtained biometric modality data is fraudulent and to remove the attested device key pair.

In yet another embodiment of the present disclosure, the instructions when read and executed by the processor, cause the electronic device to calculate an anomaly score for the biometric modality data represented by each of the plurality of signals, calculate a risk score based on the entanglement indicator value and the anomaly scores, compare the risk score against a risk score threshold value, and determine whether the obtained biometric modality data is of a live person at least in part on whether the risk score satisfies the risk score threshold value.

In yet another embodiment of the present disclosure, the instructions when read and executed by the processor, cause the electronic device to insert at least one of decoy qubits and decoy shots into the qubit registers according to a randomized policy over register positions, time slots, prepared states and measurement bases. Moreover, the instructions when read and executed by the processor, cause the electronic device to calculate a decoy mismatch rate and compare the decoy mismatch rate against a mismatch threshold. In response to determining the decoy mismatch rate fails to satisfy the mismatch threshold, the instructions when read and executed by the processor, cause the electronic device to determine the obtained biometric modality data is fraudulent.

In yet another embodiment of the present disclosure, the instructions when read and executed by the processor, cause the electronic device to obtain times at which each one of the one or more sensors captured the respective signal and calculate the window of time according to the equation $\Delta t = \max\_k \{t\_k\} - \min\_k \{t\_k\}$, where $\Delta t$ represents a duration of the window of time, and t_k represents the time a signal was captured. The capture times generated by each of the sensors only increase relative to previous capture times generated by the respective sensor. Moreover, {t_k} represents a set of all t_k, max_k represents the maximum time t_k in the set {t_k}, and min_k represents the minimum time t_k in the set {t_k}.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
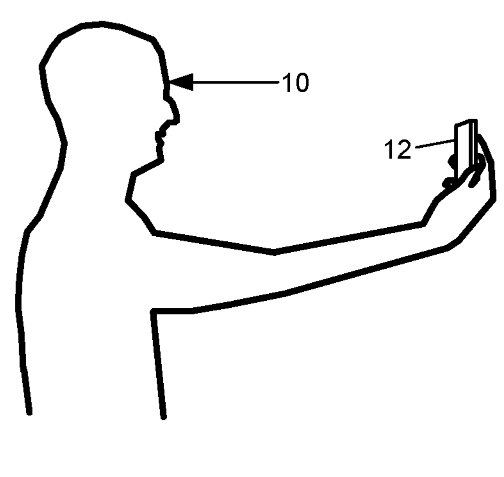
FIG. 1 is a side view of a person operating an example electronic device to capture authentication data.

FIG. 1 is a side view of a person 10 operating an example electronic device 12 to capture authentication data, for example, during an authentication transaction. Authentication data can be any data that may be used, for example, to verify the identity of a person. Authentication data that may be used to verify the identity of a person includes, but is not limited to, biometric modality data of the person and biometric templates created from the biometric modality data.

Figure 2:
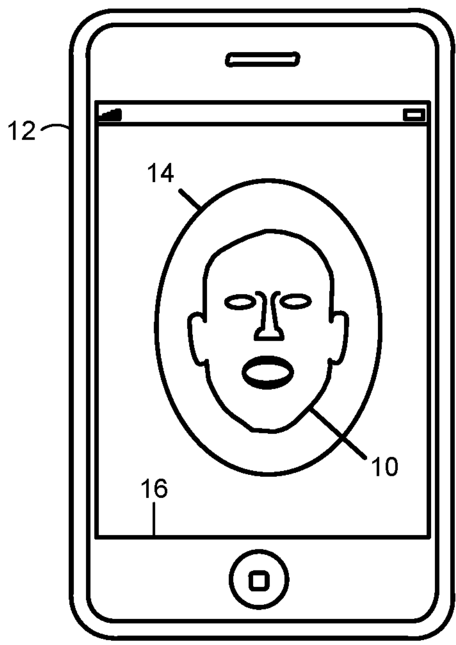
FIG. 2 is a front view of the example electronic device displaying an example visual aid and a facial image of the person positioned within the visual aid.

FIG. 2 is a front view of the electronic device 12 displaying an example visual aid 14 and a facial image of the person 10 positioned within the visual aid 14 while capturing biometric modality data during, for example, an authentication transaction. The visual aid 14 may be displayed by the electronic device 12 and functions as a guide that enables people to capture facial image data usable for enhancing liveness detection and generating trustworthy authentication transaction results. One example of the visual aid 14 is an oval. Other examples of the visual aid 14 include, but are not limited to, a circle, a square, a rectangle, and an outline of the head of the person. Moreover, the visual aid may be any shape defined by lines and curves. However, it is not necessary that the visual aid 14 be displayed by the electronic device 12. The visual aid 14 may alternatively be a part of the electronic device 12 itself. Thus, another example of the visual aid 14 may be a perimeter 16 of the electronic device 12 display screen.

Figure 3:
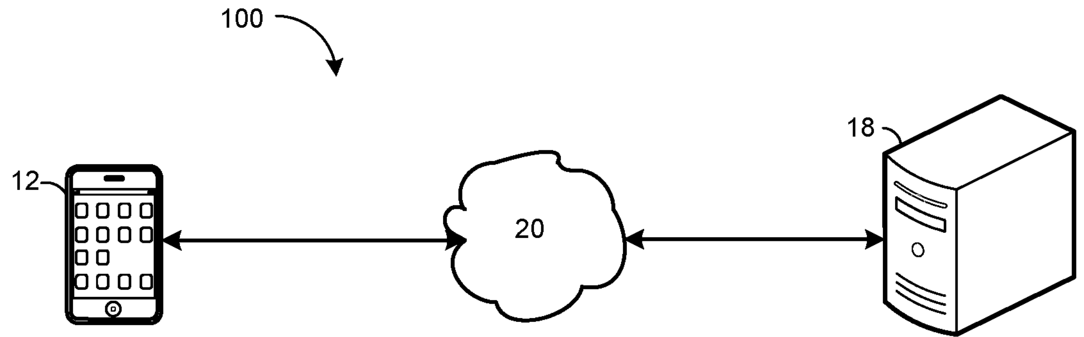
FIG. 3 is a schematic diagram illustrating an example computing system for enhancing detection of fraudulent authentication data according to an embodiment of the present disclosure.

FIG. 3 is a schematic diagram illustrating an example computing system 100 for enhancing detection of fraudulent authentication data according to an embodiment of the present disclosure. As shown in FIG. 3, the main elements of the system 100 include the electronic device 12 and a quantum computer 18 communicatively connected via a network 20.

In FIG. 3, the electronic device 12 can be any wireless hand-held consumer electronic device capable of at least downloading applications over the Internet, running applications, capturing and storing data temporarily and/or permanently, and otherwise performing any and all functions described herein by any non-quantum computer, non-quantum computer system, non-quantum server or non-quantum electronic device included in the system 100. Moreover, the electronic device 12 may alternatively be any type of non-quantum server or non-quantum computer implemented as a network server or network computer. Other examples of the electronic device 12 include, but are not limited to, a cellular phone, a tablet computer, a phablet computer, a laptop computer, a camera and any type of hand-held consumer electronic device having wired or wireless networking capabilities capable of performing the non-quantum functions, methods, and/or algorithms described herein.

Although the electronic device 12 is described herein as performing non-quantum functions, it is contemplated by the present disclosure that the electronic device 12 may include, for example, a quantum processing unit and quantum memory such that the electronic device 12 may perform quantum functions as well as non-quantum functions.

The quantum computer 18 performs quantum functions only. The quantum computer 18 and the electronic device 12 communicate via the network 20. Such communication facilitates combining the capabilities of quantum computing with non-quantum computing to enhance the detection of fraudulent authentication data. As a result, the accuracy and trustworthiness of authentication transaction results are facilitated to be enhanced. It is contemplated by the present disclosure that the quantum computer 18 may alternatively be remotely located in a cloud data center.

The network 20 may be implemented as a 5G communications network. Alternatively, the network 20 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 20 may also be any type of wired network or a combination of wired and wireless networks.

It is contemplated by the present disclosure that the number of electronic devices 12 and quantum computers 18 is not limited to the number shown in the system 100. Rather, any number of electronic devices 12 and quantum computers 18 may be included in the system 100.

Figure 4:
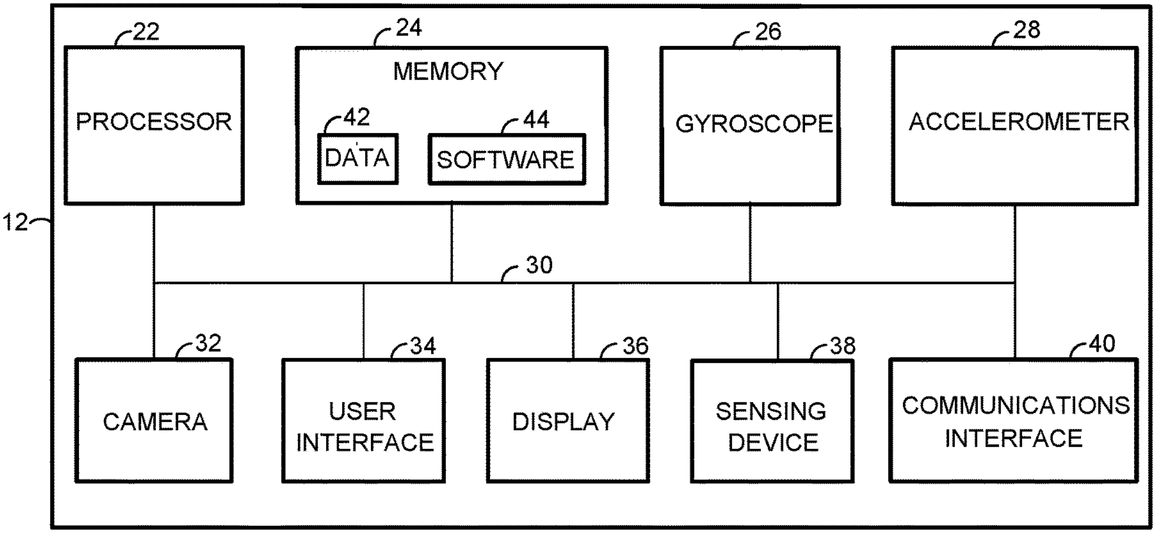
FIG. 4 is a more detailed schematic diagram illustrating the example electronic device.

FIG. 4 is a more detailed schematic diagram illustrating the example electronic device 12 used for enhancing detection of fraudulent authentication data, for example, during an authentication transaction. The electronic device 12 includes components such as, but not limited to, one or more processors 22, a memory 24, a gyroscope 26, an accelerometer 28, a bus 30, a camera 32, a user interface 34, a display 36, a sensing device 38, and a communications interface 40. General communication between the components in the electronic device 12 is provided via the bus 30.

The processor 22 executes software instructions, or computer programs, stored in the memory 24. It is contemplated by the present disclosure that the number of processors 22 is not limited to the number shown in the electronic device 12. Rather, any number and type of processor(s) 22 may be included in the electronic device 12. As used herein, the term processor is not limited to just those integrated circuits referred to in the art as a processor, but broadly refers to a computer, a microcontroller, a microcomputer, a programmable logic controller, an application specific integrated circuit, a Tensor Processing Unit (TPU), a Graphics Processing Unit (GPU), and any other programmable circuit capable of executing at least a portion of the functions and/or methods described herein. The above examples are not intended to limit in any way the definition and/or meaning of the term "processor." The processor 22 may additionally include a quantum processing unit for performing quantum functions.

The memory 24 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 24 may be used to store any type of data 42, for example, feature maps, feature vectors, entanglement indicator values, threshold values, risk scores, biometric modality data, biometric templates, audit records, metadata, and calibration data. Calibration data includes, for example, means, variances, confidence intervals and test statistics.

Feature vectors generated using non-quantum techniques may be mapped to a qubit register using, for example, amplitude encoding algorithms, angle encoding algorithms, and instantaneous-quantum-polynomial algorithms. Entanglement indicator values are a liveness measure. Examples of entanglement indicator values include, for example, an estimated Bell-state fidelity (F), the Clauser-Horne-Shimony-Holt (CHSH) parameter S, an expectation value of an entanglement witness value that is negative, multipartite nonlocality indicators, and measurement-device-independent indicators. Examples of multipartite nonlocality indicators include, but are not limited to, Mermin and Svetlichny type.

A biometric template can be any type of mathematical representation of biometric modality data. Biometric modality data is the data of a biometric modality of a person.

For the methods and systems described herein, data for a combination of two or more different biometric modalities may be used. Alternatively, or additionally, biometric data for the same modality but captured via different capture devices, or sensors may be used. Alternatively, or additionally, biometric data for the same modality captured by the same capture device, or sensor, at different times may be used.

Biometric modality data may be captured in any manner. For example, for face biometric data, the camera 32 may record image data of the face of a person by taking one or more photographs or digital images of the person, or by taking a video of the person. The camera 32 may record a sequence of digital images at irregular or regular intervals. A video is an example of a sequence of digital images being captured at a regular interval. Thus, image data as described herein may be a sequence of digital images or a video. For voice biometric data, the electronic device 12 may record a person speaking.

Captured biometric modality data may be temporarily or permanently stored in the electronic device 12 or in any device capable of communicating with the electronic device 12 via the network 20. Alternatively, the captured biometric modality data may not be stored. As used herein, capture means to record temporarily or permanently, any data including, for example, biometric modality data of a person.

Additionally, the memory 24 can be used to store any type of software 44. As used herein, the term "software" is intended to encompass an executable computer program that exists permanently or temporarily on any non-transitory computer-readable recordable medium that causes, for example, the electronic device 12 to perform at least a portion of the functions, methods, and/or algorithms described herein. Application programs are software and include, but are not limited to, operating systems, Internet browser applications, authentication applications, user liveness detection applications, a feature extraction application, wavelet transforms, Principal Component Analysis (PCA) algorithms, calibration applications, classifiers, and any other software and/or any type of instructions associated with algorithms, processes, or operations for controlling the general functions and operations of the electronic device 12. The software may also include computer programs that implement buffers and use RAM to store temporary data.

Authentication applications enable the electronic device 12 to conduct user verification and identification (1:C) transactions with any type of authentication data, where "C" is a number of candidates.

A non-parametric statistical test, for example, the Kolmogorov-Smirnov test or Welch's t-test may be used to determine a threshold value. The tests may be applied to compare the distributions of an entanglement indicator value calculated based on biometric modality data of a live person against a replay entanglement indicator value. The threshold value may be determined at the point of maximal separation or minimal overlap between the distributions, such that the true-positive rate (TPR) for biometric modality data captured live during, for example, authentication transactions is greater than or equal to ninety-nine percent and the false-acceptance rate (FAR) for replayed biometric modality data is less than or equal to one percent. The threshold value may be used to determine whether biometric modality data obtained, for example, during an authentication transaction is genuine or fraudulent.

Noise scales are chosen to preserve a target operating point of the true-positive rate (TPR) and the false acceptance rate (FAR) while bounding disclosure risk, and differential parameters are recorded in calibration metadata.

The threshold value may be re-calibrated, for example, when changes occur in the environment in which biometric modality is being captured. Changes can include, for example, lighting changes for capturing facial images or background noise for capturing voice data. Alternatively, Receiver Operating Characteristic (ROC) curve analysis may be used to fine-tune the threshold value. Using ROC, the inflection point with the highest Youden's J statistic may be determined to be the fine-tuned threshold value.

Each time a threshold value is established or re-calibrated, metadata is generated that includes, but is not limited to: summary statistics, for example, means and variances of one or more entanglement indicator values under live and attack conditions; confidence intervals and/or error-rate bounds at threshold value(s); the identity of any statistical test(s) employed and their resulting test statistics and margins, for example, $\varepsilon$ and $\varepsilon'$; shot budgets, error-mitigation options, and circuit/feature-map versions used during calibration; and policy identifiers for ensuring a window of time is within a maximum window of time and for decoy configuration. The threshold value(s) and associated metadata can be written to a protected configuration register in, for example, a trusted execution environment (TEE), a trusted platform module (TPM), or secure element, and measured for inclusion in an attestation report. During cryptographic attestation, the electronic device 12 can prove the integrity and provenance of the active threshold value(s) and calibration metadata by signing the measurement of the protected register with an attested device key. The metadata is allowed if the measurement matches an authorized allow-list or policy descriptor.

Shots may be allocated heterogeneously across measurement settings to minimize the variance of an entanglement indicator value, for example, the variance of the fidelity when the entanglement indicator value is expressed in terms of fidelity, subject to a latency bound or total-shot budget, using importance weighting or convex optimization.

Classifiers include, for example, Deep Neural Networks (DNNs), Time Delay Neural Networks (TDNNs), Recurrent Neural Networks (RNNs), Convolutional Neural Networks (CNNs), Residual Networks (ResNets), Generative Adversarial Networks (GANs), and transformers.

Principal Component Analysis (PCA) algorithms and wavelet transforms function to convert captured or received biometric data, for example, image data into a condensed feature vector, while mel-spectrogram-based CNNs may be used to convert audio or voice data into an embedding.

The process of verifying the identity of a person is known as a verification transaction or an authentication transaction. Generally, during a verification transaction a biometric template is generated from biometric modality data of a person captured during the transaction. Typically, data for a single biometric modality is captured. The generated biometric template is compared against a corresponding record biometric template of the person and a matching score is calculated for the comparison. If the matching score meets or exceeds a threshold score, the identity of the person is verified as true. Alternatively, the captured biometric modality data may be compared against corresponding record biometric modality data to verify the identity of the person Known methods of biometric authentication have difficulty detecting subtle modifications made to genuine authentication data. The subtle modifications are imperceptible to humans.

Anomalies may be present in each characteristic that may be associated with synthetic speech. For example, for the range of pitch an anomaly may be that the received voice biometric data has a narrower range of pitch than typically included in authentic speech. For timbre, anomalies can include, but are not limited to, a lack of expected complexity, unusual harmonic structures, and erratic formant movements. For intensity or loudness, an anomaly may be variations in volume that do not correspond with an expressed or expected emotion. For voice resonators, an anomaly may be less variability and responsiveness. For pace, an anomaly may be unnatural timing patterns like a consistent speech rate or abnormal pauses. For prosody, anomalies can include inconsistencies in stress patterns or intonation curves unusual for the context or language norm. For rhythm, anomalies can include unusual pauses or changes in the rhythm of speech such as hesitations or rushed sequences. For natural speech, anomalies can include, but are not limited to, a lack of natural pitch variation across sentences, an unexpected pitch contour within a phrase, unusually long or short durations, or a lack of variability in durations. For frequency, an anomaly can be that the frequency does not exceed a threshold established for synthetic speech, for example, up to 5,354 Hz.

Wavelet transforms can be used to decompose a digital image into multiple frequency bands which facilitate analyzing high and low frequency artifacts in the image. For example, a digital image may be processed by a wavelet transform to decompose the image into high, low and medium frequency artifacts. High-frequency artifacts capture fine details, such as edges and textures, while low-frequency artifacts represent broader, smoother areas of the image. The artifacts imparted to digital images via manipulation associated with morphing are typically high-frequency artifacts. Examples of high-frequency artifacts associated with morphing include, but are not limited to, texture inconsistencies, edge sharpness variations, and pixel level anomalies caused by compression or resampling during morphing. Examples of texture inconsistencies include, but are not limited to, blending irregularities in skin patterns or hairlines. Examples of edge sharpness variations include, but are not limited to, unnatural transitions between facial features.

Wavelet transforms facilitate isolating these high-frequency artifacts to identify unnatural patterns that would not be in an unaltered image. For example, the high-frequency artifacts of a received image may be compared against record high-frequency artifacts of a corresponding bona fide image. Any differences may be anomalies that are the result of morphing. Thus, fine details of the image are checked for manipulation that can be indicative of morphing. Wavelet transforms may generate statistical anomalies, for example, unnatural spectral patterns. Such anomalies may be indicative of morphing.

The gyroscope 26 and the one or more accelerometers 28 generate data regarding rotation and translation of the electronic device 12 that may be communicated to the processor 22 and the memory 24 via the bus 30. The gyroscope 26 and accelerometer 28 are typically included in electronic devices 12 that are primarily mobile, for example, smart phones and other smart devices, but not in electronic devices 12 that are primarily stationary, for example, servers or personal computers. Thus, the electronic device 12 may alternatively not include the gyroscope 26 or the one or more accelerometers 28 or may not include either.

The camera 32 captures image data. The camera 32 can be one or more imaging devices configured to record image data of at least a portion of the body of a person including any biometric modality of the person while utilizing the electronic device 12. The camera 32 may also capture digital images of printed images.

The camera 32 may record image data under any lighting conditions including infrared light. The camera 32 may be integrated into the electronic device 12 as one or more front-facing cameras and/or one or more rear facing cameras that each incorporates a sensor, for example and without limitation, a CCD or CMOS sensor. Alternatively, the camera 32 can be external to the electronic device 12. As used herein, capture means to record temporarily or permanently, any data including, for example, biometric modality data of a person. The camera 32 is a sensor or capture device that captures image data, for example, facial image data of a person.

The user interface 34 and the display 36 allow interaction between a user and the electronic device 12. The display 36 may include a visual display screen or monitor that displays information. For example, the display 36 may be a Liquid Crystal Display (LCD), an active-matrix display, plasma display, or cathode ray tube (CRT). The user interface 34 may include a keypad, a keyboard, a mouse, an illuminator, a signal emitter, one or more microphones, and/or speakers.

It is contemplated by the present disclosure that, for example, the camera 32, keypad, keyboard, mouse, and microphones in the electronic device 12 may be considered sensors or capture devices that can be used for capturing biometric modality data. Each sensor or capture device may be considered a different channel for receiving biometric modality data. The biometric modality data received through each different channel is different. When the electronic device 12 includes more than one microphone, each microphone may be used to independently capture voice data of a person while speaking and may do so simultaneously. Each microphone constitutes a separate channel, thus the voice data captured by each microphone is different. Thus, it is contemplated by the present disclosure that a same device, for example, the electronic device 12 may simultaneously capture different versions of the same voice biometric data. Alternatively, the timing of capturing the same or different biometric modality data may be different.

Data for different biometric modalities may also be captured simultaneously using the same device. For example, facial image data of a person may be captured by the electronic device 12 using the camera 32 while the microphone is used to capture voice data of the person. The electronic device 12 as described herein is a sensor or capture device because it includes sensors or capture devices as described herein.

The user interface 34 and the display 36 may be integrated into a touch screen display. Accordingly, the display 36 may also be used to show a graphical user interface, which can display various data and provide "forms" that include fields that allow for the entry of information by the user. Touching the screen at locations corresponding to the display of a graphical user interface allows the person to interact with the electronic device 12 to enter data, change settings, control functions, etc. Consequently, when the touch screen is touched, the user interface 34 communicates this change to the processor 22, and settings can be changed, or user entered information can be captured and stored in the memory 24. The display 36 may function as an illumination source to apply illumination to an object while image data for the object is captured.

The sensing device 38 may include Radio Frequency Identification (RFID) components or systems for receiving information from other devices in the system 100 and for transmitting information to other devices in the system 100. The sensing device 38 may alternatively, or additionally, include components with Bluetooth, Near Field Communication (NFC), infrared, or other similar capabilities. Communications between the electronic device 12 of the user and the quantum computer 18 may occur via NFC, RFID, Bluetooth or the like only so a network connection from the electronic device 12 is unnecessary.

The communications interface 40 may include various network cards, and circuitry implemented in software and/or hardware to enable wired and/or wireless communications with other electronic devices 12 (not shown) and the quantum computer 18 via the network 20. Communications include, for example, conducting cellular telephone calls and accessing the Internet over the network 20. By way of example, the communications interface 38 may be a digital subscriber line (DSL) card or modem, an integrated services digital network (ISDN) card, a cable modem, or a telephone modem to provide a data communication connection to a corresponding type of telephone line. As another example, the communications interface 38 may be a local area network (LAN) card (e.g., for Ethernet™ or an Asynchronous Transfer Model (ATM) network) to provide a data communication connection to a compatible LAN. As yet another example, the communications interface 40 may be a wire or a cable connecting the electronic device 12 with a LAN, or with accessories such as, but not limited to, other electronic devices. Further, the communications interface 40 may include peripheral interface devices, such as a Universal Serial Bus (USB) interface, a PCMCIA (Personal Computer Memory Card International Association) interface, and the like.

The communications interface 40 also allows the exchange of information across the network 20. The exchange of information may involve the transmission of radio frequency (RF) signals through an antenna (not shown). Moreover, the exchange of information may be between the electronic device 12 and the quantum computer 18, other electronic devices (not shown), and other computer systems (not shown) capable of communicating over the network 20.

Examples of other computer systems (not shown) include computer systems of service providers such as, but not limited to, financial institutions, medical facilities, national security agencies, merchants, and authenticators. The electronic devices (not shown) may be associated with any user or with any type of entity including, but not limited to, commercial and non-commercial entities.

Figure 5:
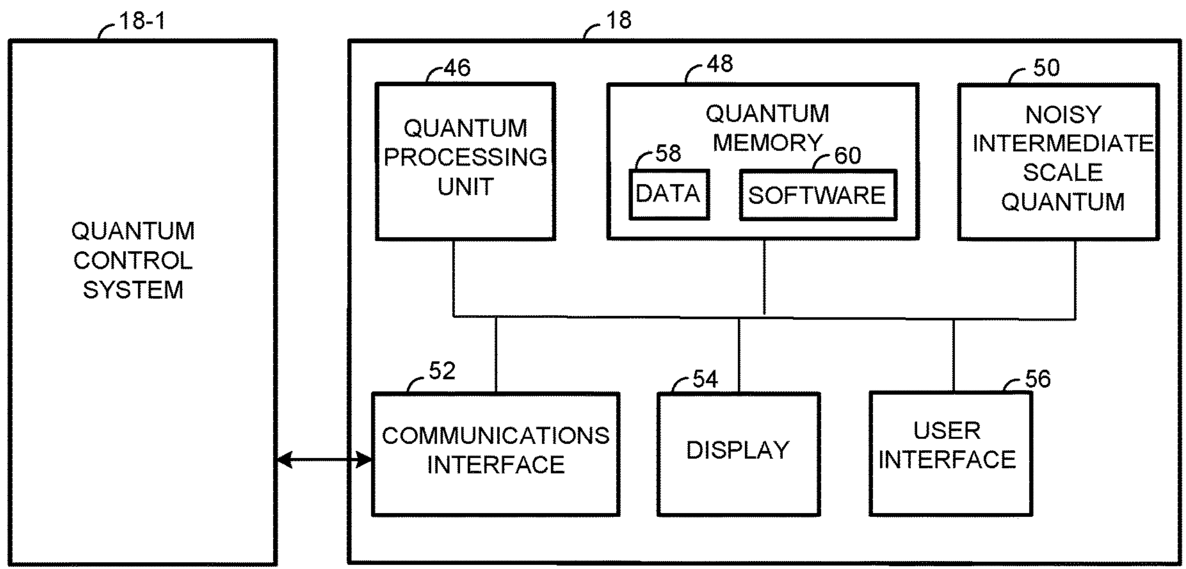
FIG. 5 is a detailed schematic diagram illustrating an example quantum computer and an example quantum control system included in the computing system shown in FIG. 3.

FIG. 5 is a detailed schematic diagram illustrating the example quantum computer 18 and an example quantum control system 18-1 used for enhancing detection of fraudulent authentication data, for example, during an authentication transaction according to an embodiment of the present disclosure. The quantum computer 18 and quantum control system 18-1 are typically proximate each other. It is contemplated by the present disclosure that the quantum computer 18 and quantum control system 18-1 may alternatively be remotely located in a cloud data center.

The quantum computer 18 includes components such as a quantum processing unit 46, a quantum memory 48, noisy intermediate scale quantum (NISQ) 50, a communications interface 52, a display 54, and a user interface 56. The quantum control system 18-1 typically includes components such as, but not limited to, analog-to-digital converters, digital-to-analog converters, and field programmable gate arrays. The components of the quantum computer 18 typically do not communicate using a bus as in non-quantum computers.

Transmissions from, for example, the electronic device 12 to the quantum computer 18 are received by the quantum control system 18-1. The quantum control system 18-1 translates the transmissions into real physical signals for the qubits. The quantum processing unit 46 transmits results, for example, detected anomalies to the quantum control system 18-1, which transmits the results to, for example, the electronic device 12.

The quantum processing unit 46 manipulates qubits instead of bits. Qubits as used herein refers to quantum states. The quantum processing unit 46 receives quantum gate instructions from the quantum control system 18-1 and uses qubits to perform computations.

The quantum memory 48 may store any type of data 58 similar to the data 42 that may be stored in the memory 24 of the electronic device 12. For example, the quantum memory 48 may store metadata and threshold values. The quantum memory 48 may also store software 60 for performing quantum functions. Such software 60 includes, but is not limited to, quantum encoding algorithms, entanglement software, decoy-injection software, verifier software, error mitigation software, measurement applications, calibration software, and Post Quantum Cryptography (PQC) Algorithms, as well as Quantum Support Vector Machines (QSVM) and Variational Quantum Circuits (VQC). Additionally, or alternatively, the quantum memory 48 may maintain quantum states of one or more qubits forming a qubit register for a dwell period that facilitates enhancing detection of fraudulent authentication data as described herein. For example, the quantum memory 48 may store single qubit states, entangled pairs, or multi-party states, and encoded registers used by the encoding algorithms and entanglements software.

Quantum encoding algorithms include, for example, amplitude encoding algorithms and angle encoding algorithms. Amplitude encoding algorithms, angle encoding algorithms, and Instantaneous-quantum-polynomial algorithms are encoding schemes that each function to encode feature vectors created, for example, by the electronic device 12 into qubit registers or quantum state registers. Angle encoding algorithms also enable encoding a feature vector created, for example, by the electronic device 12 into qubit registers or quantum state registers. Instantaneous-quantum-polynomial (IQP) algorithms are designed to implement a computation that is intractable for nonquantum computers and verifiable by a remote adjudicator.

Angle encoding algorithms are preferred for low-latency mobile flows, IQP algorithms are preferred for robustness to noise with shallow depth, and amplitude encoding algorithms are preferred for maximal information density when shot budgets permit. The encoding algorithms described herein effectively implement quantum feature maps. Low-latency as described herein is the time required to execute the methods and algorithms described herein to yield a decision regarding genuineness of biometric modality data. The time is, for example, within a few milliseconds.

Entanglement software entangles encoded feature vectors by, for example, applying a Hadamard gate to qubit registers created for image data.

Error mitigation software includes, but is not limited to, zero-noise extrapolation (ZNE) software, Clifford data regression software, probabilistic error cancellation software, read out error mitigation software, and randomized compiling which may be used during QSVM and VQC operations to facilitate reducing noise-induced inaccuracies in anomaly detection. The NISQ 48 is hardware that can be characterized by limited qubit counts, higher error rates, and non-trivial decoherence. As a result, the error mitigation software is run on the NISQ 48.

Zero noise extrapolation is an error mitigation step that may be applied before calculating an entanglement indicator value. Zero-noise extrapolation can be implemented by executing entanglement software at three distinct noise-amplification levels. The three levels are a native noise level, a moderate amplification level, and a higher amplification level. The moderate amplification may be implemented by doubling quantum gate durations and the higher amplification may be implemented by tripling gate durations.

Measurement software calculates entanglement indicator values that serve as liveness indicators. As such, the entanglement indicator values help distinguish data captured of a live person's biometric modality from fraudulent or replayed biometric modality data. As a result, entanglement indicator values facilitate enhancing the accuracy and trustworthiness of authentication transaction results. Expectation values may be calculated as a measure of a quantum observable, for example, a Pauli operator. Error-mitigation may be applied prior to calculating the entanglement indicator values. Error mitigation may be applied using, for example, readout-error correction software, zero-noise extrapolation (ZNE) software, Clifford data regression (CDR) software, or probabilistic error cancellation (PEC).

Readout error correction is applied to measurements of the encoded and entangled feature registers before calculating the expectation values. Thus, in some embodiments the entanglement indicator value is calculated from readout-corrected expectations of measurements on the encoded and entangled feature registers. Zero-noise extrapolation (ZNE), Clifford data regression (CDR), or probabilistic error cancellation (PEC) may be applied to readout corrected expectations of measurements on the encoded and entangled feature registers.

The measurement software can generate fidelity estimates at each of the three levels. The fidelity estimates for the native noise level, the moderate amplification level, and the higher amplification level can be $F_0$, $F_1$, and $F_2$, respectively. The fidelity estimates can be fit to a quadratic curve and extrapolated to a zero-noise intercept. The extrapolated fidelity can be used as the entanglement indicator value during liveness detection instead of the fidelity estimate $F_0$. Thus, the measurement software can generate the entanglement indicator value. Calculating the entanglement indicator value using the extrapolated fidelity facilitates canceling errors inherent to NISQ 48 operation. As a result, detection of genuine quantum correlations versus replayed or decohered states is facilitated to be enhanced.

The decoy injection software may randomly prepare decoys in $\{|0\rangle,|1\rangle,|+\rangle,|-\rangle\}$ and interleave the decoys among modality registers prior to entanglement. After measurement, any mismatch contributes to a decoy mismatch rate and may also reduce the entanglement indicator value below the threshold value.

The verifier software computes the decoy-mismatch rate and rejects biometric modality data if the decoy mismatch rate exceeds a decoy threshold.

Quantum Support Vector Machines (QSVM) facilitate detecting anomalies in authentication data. Feature vectors include floating point numbers that can represent features extracted from authentication data, for example, biometric modality data. The floating point numbers may be referred to herein as features. Using QSVM and Variational Quantum Circuits (VQC) enables enhanced anomaly detection compared against contemporary techniques using non-quantum hardware and software.

Post Quantum Cryptography algorithms facilitate encrypting data during transmission, for example, from the quantum computer 18 to the electronic device 12 via the network 20. Moreover, PQC algorithms facilitate encrypting stored biometric data and safeguarding sensitive data against quantum capable adversaries to ensure long term data integrity. PQC algorithms include, but are not limited to, lattice-based encryption algorithms. Encryption provided by PQC algorithms may extend to feature vectors transmitted from the electronic device 12 to the quantum computer 18 via the network 20 or may be limited to final outputs of the quantum computer 18 and stored biometric records.

It is contemplated by the present disclosure that the quantum functions described herein may be performed by a quantum computer, for example the quantum computer 18. Although the electronic device 12 is described herein as performing non-quantum functions, it is contemplated by the present disclosure that the electronic device 12 may include, for example, a quantum processing unit and quantum memory such that the electronic device 12 may perform quantum functions as well as non-quantum functions.

It is contemplated by the present disclosure that the electronic device 12, quantum computer 18 and any other computer devices (not shown) and/or systems (not shown) that may be in the computing system 100 may be implemented in a cloud environment.

The communications interface 52, display 54, and user interface 56 are similar to the communications interface 40, display 36, and user interface 34, respectively, described herein with regard to the electronic device 12.

Biometric modality data may be captured by one or more capture devices, or sensors, during an authentication transaction. For example, the electronic device 12 may capture the biometric modality data or a combination of electronic devices (not shown) in the computer system 100 may be used to capture biometric modality data. Each capture device, or sensor, generates one or more timestamps while capturing biometric modality data. As a result, a plurality of timestamps may be generated when capturing biometric modality data. The capture times, or timestamps, generated by each sensor only increase relative to previous capture times or timestamps.

Figure 6:
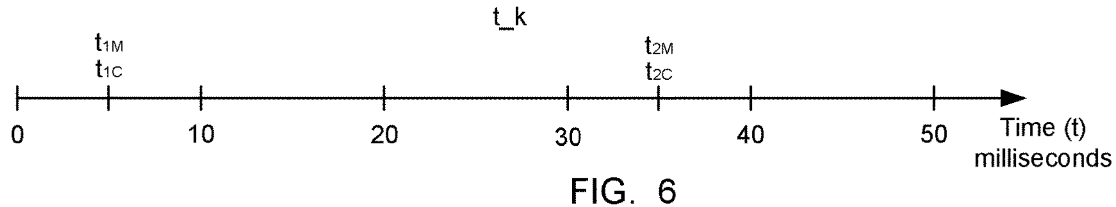
FIG. 6 is a diagram illustrating example times along a timeline at which biometric data may be captured by sensors.

FIG. 6 is a diagram illustrating example times t_k along a timeline at which biometric data may be captured by sensors, for example, the camera 32 and a microphone in the electronic device 12 during, for example, an authentication transaction. The timeline includes times $t_{1C}$, $t_{2C}$, $t_{1M}$, and $t_{2M}$. The time $t_{1C}$ and $t_{2C}$ correspond to the times at which the camera 32 started and ended capturing image data, respectively. The times $t_{1M}$ and $t_{2M}$ correspond to the times at which the microphone started and ended capturing voice data, respectively. The times $t_{1C}$ and $t_{1M}$ are the same and the times $t_{2C}$ and $t_{2M}$ are the same. However, the times $t_{1C}$ and $t_{1M}$ may be different and the times $t_{2C}$ and $t_{2M}$ may be different. The times $t_{1C}$, $t_{2C}$, $t_{1M}$, and $t_{2M}$ are times t_k that correspond to timestamps applied to the captured biometric modality data. Time $t_{1M}$ is five (5) milliseconds and the time $t_{2M}$ is thirty-five (35) milliseconds.

The electronic device 12 may capture, obtain, or receive signals that include tuples. Sensors generate a tuple when capturing biometric modality data. For continuously captured biometric data, the tuple may include, for example, a payload, a timestamp indicating the time the sensor started capturing biometric modality data, a timestamp indicating the time the sensor stopped capturing biometric modality data, a nonce, a signature over the tuple, and an attested status of the clock in the sensor that captured the biometric modality data. For biometric modality data captured at a discrete time, the tuple may include, for example, the payload, a timestamp indicating the time the biometric modality data was captured, a nonce, an electronic signature over the tuple, and an attested status of the clock in the sensor that captured the biometric modality data. The payload is the captured biometric modality data. If the signature on a tuple is invalid, the nonce is stale, or the sensor clocks are un-attested, the obtained biometric modality data may be deemed fraudulent. Tuples are included in signals transmitted by sensors.

Each capture device or sensor is associated with an attested device key pair. The attested device key pair for each sensor may be the same or different. Each sensor includes a clock that facilitates associating a timestamp with the captured biometric modality data. Timestamps are bound to the attested key pair of the sensor that captured the biometric modality data. Because the timestamps are from the signed tuple, the timestamps and thus the capture times are also considered to be signed. It is contemplated by the present disclosure that the sensors periodically re-attest to maintain trust in clock timing and thus the associated timestamps.

A nonce is a time varying value that is used only once within a specific context, for example, an authentication transaction. Nonces ensure the uniqueness of cryptographic operations to facilitate preventing, for example, replay attacks. A nonce that is issued for a certain authentication transaction, is unused, and arrives within an acceptance window is deemed fresh. A fresh nonce may be referred to herein as a freshness nonce. A replayed or reused nonce is stale. Nonces that arrive outside of an acceptance window are also stale. Biometric modality data associated with stale nonces may be fraudulent. As a result, biometric modality data associated with stale nonces is not used during authentication transactions to prove a person's identity.

A set of times {t_k} may be created from the signed and attested timestamps. The times $t_{1C}$, $t_{2C}$, $t_{1M}$, and $t_{2M}$ form such a set. The set of times {t_k} represents a set of all the times t_k. "t" represents the time given by a timestamp and "k" represent the position of the time "t" in the set {t_k}. Thus, for example, the times $t_{1C}$, $t_{2C}$, $t_{1M}$, and $t_{2M}$ may be designated as t_1, t_2, t_3, and t_4 where t_1 is the first timestamp in the set, t_2 is the second timestamp in the set, t_3 is the third timestamp in the set, and t_4 is the fourth timestamp in the set. The set {t_k} may thus be represented as {t_1, t_2, t_3, t_4}.

Figure 7:
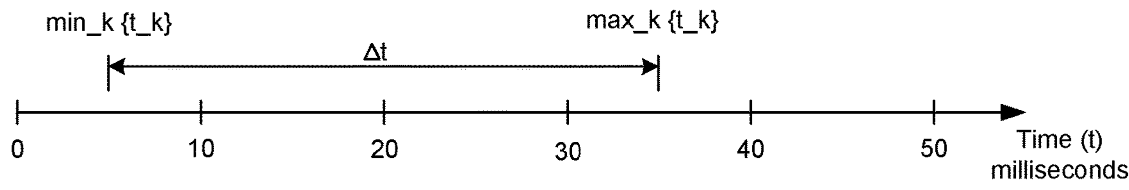
FIG. 7 is a diagram illustrating an example window of time.

FIG. 7 is a diagram illustrating an example window of time Δt extending between a minimum time min_k in the set {t_k} and a maximum time max_k in the set {t_k} along the timeline. The minimum time min_k in the set {t_k} may be designated min_k {t_k} and the maximum time max_k in the set {t_k} may be designated max_k {t_k}.

The window of time Δt may be calculated as the difference between the maximum time max_k {t_k} and the minimum time min_k {t_k} according to the equation Δt=max_k {t_k}−min_k {t_k}. Thus, the minimum time min_k {t_k} equals $t_{1C}$ and $t_{1M}$ while the maximum time max_k {t_k} equals $t_{2C}$ and $t_{2M}$. The window of time Δt may be calculated as 35-5=30 milliseconds. The window of time Δt is calculated solely from signed and attested timestamps or capture times. As a result, latencies, transmission delays, or jitters of networks, for example, the network 20 do not affect the calculated value of the window of time Δt.

The window of time Δt may be compared against a maximum window of time $\Delta t_{max}$ to determine whether the voice and image data were captured contemporaneously by the camera 32 and microphone. If the window of time Δt is greater than the maximum window of time $\Delta t_{max}$, the voice and image data were not captured contemporaneously and are fraudulent. When the window of time Δt is less than or equal to the maximum window of time $\Delta t_{max}$, the voice and image data are deemed to have been captured contemporaneously.

The maximum window of time $\Delta t_{max}$ may be, for example, between thirty (30) and fifty (50) milliseconds. Alternatively, the maximum window of time $\Delta t_{max}$ may have any duration that facilitates determining whether biometric data received via different sensors or capture devices was captured contemporaneously, for example, during an authentication transaction. Latencies, transmission delays, or jitters of networks, for example, the network 20 do not affect the calculated value of the window of time Δt and thus do not affect the comparison of the window of time Δt against the maximum window of time $\Delta t_{max}$.

Comparing the window of time Δt against $\Delta t_{max}$ facilitates enhancing the difficulty of injecting biometric modality data captured outside of $\Delta t_{max}$ into an authentication transaction to conduct a successful cyberattack. By comparing the window of time Δt against the maximum window of time $\Delta t_{max}$, replay and splicing attacks are facilitated to be prevented because biometric data captured at different times cannot be mixed to satisfy the maximum window of time $\Delta t_{max}$. Data for different biometric modalities cannot be captured at different times during the same or different transaction to satisfy the maximum window of $\Delta t_{max}$.

The window of time Δt facilitates implementing a simple check to ensure that multimodal biometric data was captured contemporaneously. The window of time Δt as described herein means a period or duration of time.

Figure 8:
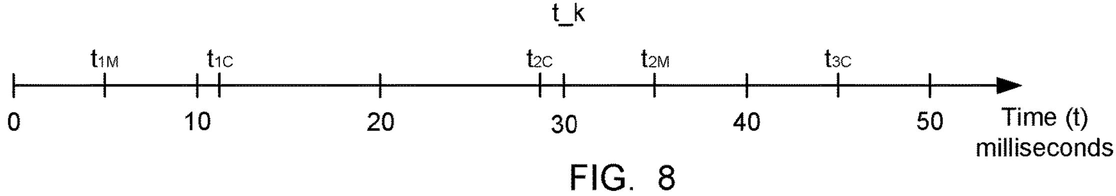
FIG. 8 is a diagram illustrating alternative example times along the timeline at which biometric modality data may be captured by sensors similar to that shown in FIG. 6.

The information shown in FIG. 8 is the same information shown in FIG. 6 as described in more detail below. As such, features illustrated in FIG. 8 that are identical to features illustrated in FIG. 6 are identified using the same reference numerals used in FIG. 6.

FIG. 8 is a diagram illustrating alternative example times t_k at which biometric modality data may be captured similar to that shown in FIG. 6. However, the image data captured by the camera 32 is not continuous. Rather, the image data captured by the camera 32 includes three discrete images captured at times $t_{1C}$, $t_{2C}$, and $t_{3C}$. The set {t_k} of times includes the times $t_{1C}$, $t_{2C}$, $t_{3C}$, $t_{1M}$, and $t_{2M}$. The maximum time max_k {t_k} is $t_{3C}$ and the minimum time min_k {t_k} is $t_{1M}$. The max_k {t_k} is forty-five (45) milliseconds and the min_k {t_k} is five (5) milliseconds. Thus, the window of time $\Delta t$ may be calculated according to the equation $\Delta t$=max_k {t_k}−min_k {t_k} as 45−5=40 milliseconds which is less than the maximum window of time $\Delta t_{max}$. As a result, the captured biometric modality data may be deemed genuine.

Figure 9:
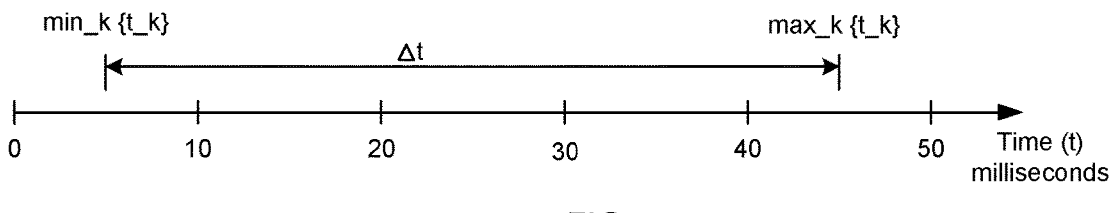
FIG. 9 is a diagram illustrating another example window of time similar to that shown in FIG. 7.

FIG. 9 is a diagram illustrating another example window of time $\Delta t$ similar to that shown in FIG. 7. However, the window of time $\Delta t$ is forty (40) milliseconds.

Figure 10:
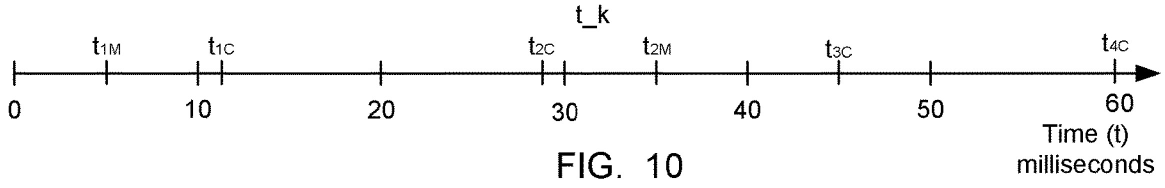
FIG. 10 is a diagram illustrating alternative example times along the timeline at which biometric modality data may be captured by sensors similar to that shown in FIG. 8.

The information shown in FIG. 10 is the same information shown in FIG. 8 as described in more detail below. As such, features illustrated in FIG. 10 that are identical to features illustrated in FIG. 8 are identified using the same reference numerals used in FIG. 8.

FIG. 10 is a diagram illustrating alternative example times t_k at which biometric modality data may be captured similar to FIG. 8. However, the image data includes four discrete images captured at times $t_{1C}$, $t_{2C}$, $t_{3C}$ and $t_{4C}$. The set of timestamps includes the times $t_{1C}$, $t_{2C}$, $t_{3C}$, $t_{4C}$, $t_{1M}$, and $t_{2M}$. The maximum time max_k {t_k} is tac and the min_k {t_k} is $t_{1M}$. Thus, the time max_k {t_k} is sixty (60) milliseconds and the time min_k {t_k} $t_{1M}$ is five (5) milliseconds. The window of time $\Delta t$ may be calculated as 60−5=55 milliseconds which is greater than the maximum window of time $\Delta t_{max}$. As a result, the captured biometric modality data was not captured contemporaneously and is fraudulent.

Figure 11:
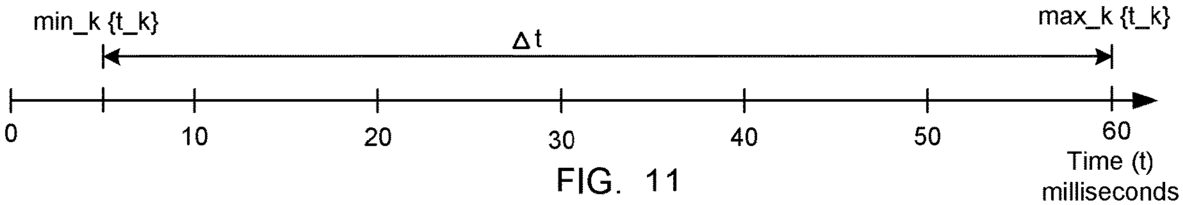
FIG. 11 is a diagram illustrating yet another example window of time similar to that shown in FIG. 9.

FIG. 11 is a diagram illustrating yet another example window of time $\Delta t$ similar to that shown in FIG. 9. However, the window of time $\Delta t$ is fifty-five (55) milliseconds which is greater than the maximum window of time $\Delta t_{max}$.

Although the biometric modality data described herein with regard to FIGS. 6 to 11 includes different biometric modalities, it is contemplated by the present disclosure that the biometric modality data may alternatively be for a same biometric modality or captured at different times within the window of time $\Delta t$, or be for the same biometric modality obtained via different sensors.

It is contemplated by the present disclosure that a single capture device, or sensor, may capture different types of data for the same biometric modality. For image biometric data, a single sensor may capture, for example, red-green-blue (RGB) image data may as well as near infrared (NIR) image data, depth plus RGB from a depth camera that outputs both time of flight (ToF)/structured light depth and an RGB stream, and Dual-gain/High dynamic range from the same camera 32.

For image data, multiple sensors may capture the same biometric modality data. For example, stereo viewpoints from left and right cameras 32 in a stereo pair of cameras 30 may be captured.

Examples of different types of data for voice or audio data include, but are not limited to, left and right microphones from a stereo microphone included in, for example, the electronic device 12, array sub-beams from a beamforming microphone array, and dual path capture from the same microphone. An example of dual path capture includes capturing an analog version and a digital version of the audio data. Examples of different types of data for fingerprint and palm include, but are not limited to, capacitive sub-arrays in which the rows and columns are read as separate channels, ultrasonic A/B apertures of the same ultrasonic sensor, and multispectral illumination for palm-vein or finger perfusion imaging. Multispectral imaging can include, for example, applying green, red and infrared light to the biometric modality.

The biometric modality data captured by each capture device, or sensor, can be converted into a feature vector using, for example, Principal Component Analysis (PCA) algorithms and wavelet transforms which function to convert captured or received image data into a condensed feature vector. PCA and wavelet transforms are typically used for converting image data into a condensed feature vector while mel-spectrogram-based Convolutional Neural Networks (CNN) may be used to convert audio or voice data into an embedding. The feature vectors and embeddings may be normalized.

An entangled state in quantum computing is a special type of multi-qubit state in which the individual qubits do not have independent values. Instead, their states are linked such that measuring one qubit instantly reveals information about the others. The encoded feature vectors are entangled using entanglement software, or an entanglement circuit, that includes, for example, a Hadamard gate and a controlled NOT (CNOT). The encoded features may be entangled by, for example, applying, the Hadamard gate to the qubits created for image data. The controlled NOT (CNOT) gate may be controlled by the image qubits or the audio qubits to generate a target multi-qubit state. Target multi-qubit states include, but are not limited to, Bell-states and Greenberger-Horne-Zeilinger (GHZ) states.

When the data for a biometric modality is encoded into multiple physical qubit registers, the Bell states and/or the GHZ states entangle a designated representative logical qubit per qubit register, for example, the most significant index, or a compressed logical qubit obtained via an isometry. A qubit register is a collection of qubits.

Entanglement software, or circuits, may also include, for example, controlled X (CX) gates that may be used to create target entangled states across the qubit or quantum registers that are from the different normalized encoded feature vectors and/or embeddings.

An entanglement indicator value may be generated that certifies the entanglement. The indicator value may be generated, for example, as a stabilizer-based Bell-state fidelity of the entanglement or as a Clauser-Horne-Shimony-Holt (CHSH) parameter S. The Bell-state fidelity can be defined as a function of a density matrix of a multi-qubit state produced by entanglement software, or circuit, and a target entangled state. For example, the entanglement fidelity may be defined by the equation $F(\rho,|\psi\rangle) \triangleq \langle\psi|\rho|\psi\rangle$, where $\rho$ denotes a density matrix of the prepared multi-qubit state and $|\psi\rangle$ denotes the target entangled pure state. The target entangled pure state may be, for example, a Bell-state, a GHZ state, a witness, cluster, or a graph state. Generally, for arbitrary states $\rho$ and $\sigma$, the fidelity may be defined by the equation $F(\rho,\sigma) \triangleq (\mathrm{Tr}\sqrt{\sqrt{\rho}\sigma\sqrt{\rho}})^2$, which reduces to $\langle\psi|\rho|\psi\rangle$ when $\sigma=|\psi\rangle\langle\psi|$.

Although the entanglement indicator value is described herein as the Bell-state fidelity of the entanglement or as the Clauser-Horne-Shimony-Holt (CHSH) parameter S, it is contemplated by the present disclosure that the entanglement indicator value may alternatively, or additionally, be an expectation value of an entanglement-witness value W that is negative, a multipartite nonlocality statistic selected from Mermin- or Svetlichny-type inequalities, or a measurement-device-independent (MDI) statistic computed under MDI assumptions.

It is contemplated by the present disclosure that zero noise extrapolation may be applied to the entangled encoded features before generating the entanglement indicator value.

Figures 12, 13:
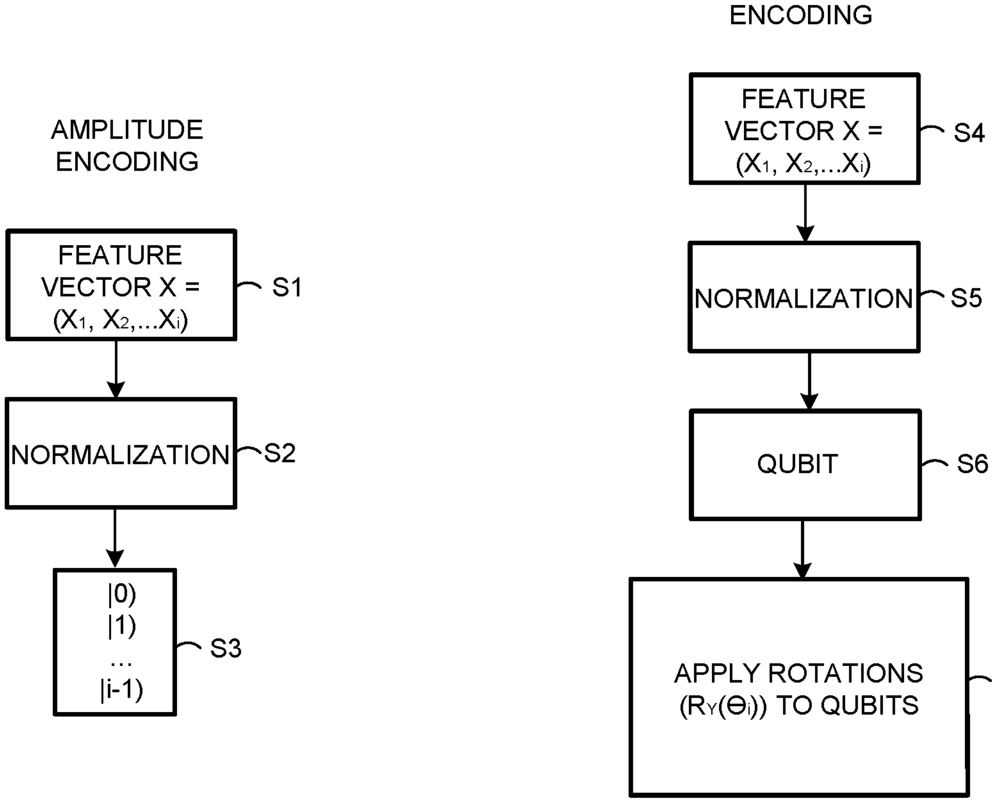
FIG. 12 is a flowchart illustrating an example method and algorithm for encoding feature vectors using amplitude encoding.
FIG. 13 is a flowchart illustrating an example method and algorithm for encoding feature vectors using angle encoding.

FIG. 12 is a flowchart illustrating an example method and algorithm for encoding feature vectors using amplitude encoding according to an embodiment of the present disclosure. The electronic device 12 can implement the non-quantum software instructions while a person operating the electronic device 12 captures biometric modality data from his or herself during, for example, an authentication transaction. FIG. 12 illustrates example operations performed when the electronic device 12 runs non-quantum software 44 stored in the memory 24 and the quantum computer 18 receives quantum gate instructions from the quantum control system 18-1 and uses qubits to perform computations.

In step S1, the software 44 executed by the processor 22 causes the electronic device 12 to capture biometric modality data of the person during, for example, an authentication transaction and to create a feature vector from the captured biometric modality data. The feature vector may be expressed as $X=(x_1, x_2 \ldots x_n)$, where $x_1, x_2 \ldots x_n$ are floating point numbers that can represent features extracted from the captured biometric modality data. Next, in step S2, the software 44 executed by the processor 22 causes the electronic device 12 to normalize the feature vector according to the equation $\Sigma_i\ xi^2=1$ and to transmit the normalized feature vector to the quantum computer 18 via the network 20.

When the captured biometric modality data includes voice and image data, PCA and wavelet transforms are typically used for converting image data into a condensed feature vector while mel-spectrogram-based Convolutional Neural Networks (CNN) are typically used for converting audio or voice data into an embedding. The feature vectors and embeddings may be normalized.

In step S3, the quantum computer 18 creates qubits from the floating-point numbers such that each floating-point number becomes the amplitude of a corresponding qubit. Thus, each floating-point number represents an amplitude in the quantum state, ensuring that $\Sigma x_i^2=1$. For example, the corresponding qubit for the floating point $x_i$ could be $|i>$. As another example, a two-dimensional vector $X=(x_1, x_2)$ can be mapped to as $x_1|0>+x_2|1>$. The thus created qubits represent an encoded version of the feature vector X.

FIG. 13 is a flowchart illustrating an example method and algorithm for encoding feature vectors using angle encoding according to an embodiment of the present disclosure. The electronic device 12 can implement the non-quantum software instructions while a person operating the electronic device 12 captures biometric modality data from his or herself during, for example, an authentication transaction. FIG. 13 illustrates example operations performed when the electronic device 12 runs non-quantum software 44 stored in the memory 24 and the quantum computer 18 receives quantum gate instructions from the quantum control system 18-1 and uses qubits to perform computations.

In step S4, the software 44 executed by the processor 22 causes the electronic device 12 to capture biometric modality data of the person during, for example, an authentication transaction and to create a feature vector from the captured biometric modality data. The feature vector may be expressed as $X=(x_1, x_2 \ldots x_n)$, where $x_1, x_2 \ldots x_n$ are floating point numbers that can represent features extracted from the captured biometric modality data. Next, in step S5, the software 44 executed by the processor 22 causes the electronic device 12 to normalize the feature vector according to the equation $\Sigma x_i^2=1$ and to transmit the normalized feature vector to the quantum computer 18 via the network 20.

In step S6, the quantum computer 18 creates qubits from the floating-point numbers such that each floating-point number becomes a rotation angle of a corresponding qubit. Thus, each floating-point number represents a rotation angle $\theta_i$.

Typically, a qubit is rotated about an axis, for example, the Y or Z-axis. Next, in step S7, the quantum computer 18 applies the rotations $R_y(\theta_i)$ to the respective qubits. For example, applying $R_y(\theta_i)$ to $|0>$ yields $$\cos\left(\frac{\theta i}{2}\right)|0\rangle+\sin\left(\frac{\theta i}{2}\right)|1\rangle.$$

While amplitude encoding adjusts amplitudes of quantum states directly, angle encoding uses rotation gates to embed feature values. This distinction ensures the correct quantum state is created based on the chosen encoding scheme.

For high-assurance access in, for example, military field operations, zero-trust cloud login environments, highly regulated industries, or decentralized biometric identity wallets, hardware-based privacy and liveness guarantees are paramount. Biometric authentication has become ubiquitous in consumer electronics and in regulated industries such as healthcare and financial services. Face and voice biometric modalities are widely used. Known liveness detection techniques such as challenge-response prompts, texture-analysis of facial images, and voice-pattern consistency checks are widely deployed to guard against spoofing. For example, it is known to use a texture-based liveness method that analyzes skin micro-structure under varying illumination and to use multi-spectral reflection analysis to distinguish live tissue from printed or mask-based forgeries. Such approaches typically inspect local contrast, pore patterns, or multi-band reflectance to differentiate genuine users from static attack presentations.

However, it is known that such techniques can be defeated by high-quality deepfakes generated by Generative Adversarial Networks (GAN) such as StyleGAN2-based facial videos that replicate realistic micro-expressions and by ultra-high-fidelity replay devices capable of reproducing fine texture and acoustic details. Moreover, for voice biometric modality data, advanced neural vocoders can synthesize speech with natural prosody and timbral consistency, rendering conventional anti-replay and spectral checks ineffective.

Known techniques for guarding against synthetic identity attacks can involve mapping non-quantum feature vectors into high-dimensional quantum feature spaces and injecting session-unique noise, which enables QSVM and VQC models to detect subtle morphing or deepfake artifacts. Such quantum-enhanced techniques may improve sensitivity to tampering, but are fundamentally passive. That is, attackers possessing a valid, noise-injected quantum state can intercept and replay the quantum state to successfully spoof an authenticator to gain unauthorized access to a computer system and data stored therein.

To solve the above problems, the electronic device 12 can obtain within a window of time, from one or more sensors a plurality of signals. Each signal includes data for a same or different biometric modality of a person. The electronic device 12 can determine whether the biometric modality data in the obtained signals was captured contemporaneously. When the biometric modality data was captured contemporaneously, a feature vector can be computed for the biometric modality data in each of the plurality of signals. Each feature vector can be encoded into a corresponding qubit register using an encoding algorithm. A multi-qubit entangled state can be generated from the qubit registers and an entanglement indicator value can be generated for the multi-qubit entangled state. The entanglement indicator value can be compared against a threshold value. In response to determining the entanglement indicator value satisfies the threshold value, the biometric modality data can be determined to be of a live person.

Figure 14:
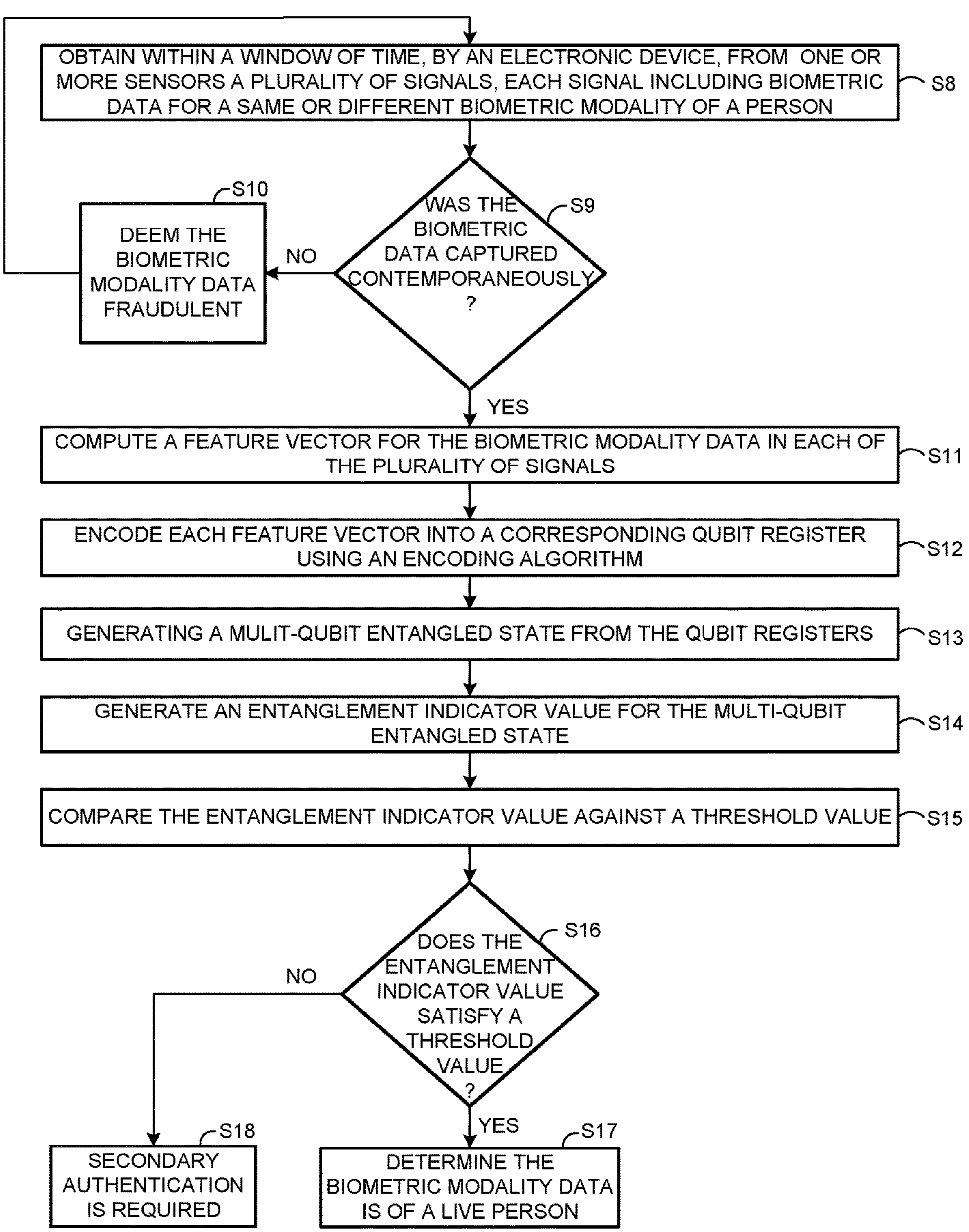
FIG. 14 is a flowchart illustrating an example method and algorithm for enhancing detection of fraudulent authentication data.

FIG. 14 is a flowchart illustrating an example method and algorithm for enhancing the detection of fraudulent authentication data encountered during, for example, an authentication transaction according to an embodiment of the present disclosure. When a person desires to conduct an activity, the person may be required to prove his or her identity before being permitted to conduct the activity. Example activities include, but are not limited to, remotely conducting a financial transaction, remotely applying to open an account or enroll in a service and entering a country as part of border security. FIG. 14 illustrates example operations performed when the electronic device 12 runs software 44 stored in the memory 24 and the quantum computer 18 receives quantum gate instructions from the quantum control system 18-1 and uses qubits to perform computations.

In step S8, the software 44 executed by the processor 22 causes the electronic device 12 to obtain within a window of time from one or more sensors a plurality of signals. The window of time may be, for example, the window of time Δt described herein with regard to FIGS. 7, 9, and 11. Each signal includes biometric data for a same or different biometric modality of a person. The signals may be received from other electronic devices in the computer system 100 via the network 20 or may be obtained via components within the electronic device 12. The person may operate the electronic device 12 to capture biometric modality data. As a result of capturing the biometric modality data, the electronic device 12 obtains and/or receives the biometric modality data. Biometric modality data in an obtained signal may be referred to as obtained biometric modality data.

For this example method and algorithm, the biometric modalities are audio data and image data. The image data may be a video of the person's face while the audio data may be voice data captured while the person is speaking. The biometric modalities may alternatively be any combination of modalities that may be used to verify the identity of the person as described herein. The biometric modality data may be processed to ensure image quality. For example, the biometric modality data may be processed to reduce noise, to enhance the image, and to reduce dimensionality.

In step S9, the software 44 executed by the processor 22 causes the electronic device 12 to determine whether the biometric modality data in the obtained signals was captured contemporaneously. Each of the obtained signals includes a tuple. The tuple includes, for example, biometric modality data, a timestamp indicating the time the biometric modality data was captured, a nonce, a signature over the tuple, and an attested status of the clock of the sensor that captured the biometric modality data.

Each capture device or sensor is associated with an attested device key pair. The attested device key pair for each sensor may be the same or different. Each sensor includes a clock that facilitates associating a timestamp with the captured biometric modality data. The timestamps are bound to the attested key pair of the sensor that captured the biometric modality data. Because the timestamps are from the signed tuple, the timestamps and thus the capture times are also considered to be signed. Thus, the timestamps are signed and attested.

A nonce is a time varying value that is used only once within a specific context, for example, during an authentication transaction. Nonces ensure the uniqueness of cryptographic operations to facilitate preventing, for example, replay attacks. A nonce that is issued for a certain authentication transaction, is unused, and arrives within an acceptance window is deemed fresh. A fresh nonce may be referred to herein as a freshness nonce. A replayed or reused nonce is stale. Nonces that arrive outside of an acceptance window are also stale. Biometric modality data associated with stale nonces may be fraudulent. As a result, biometric modality data associated with stale nonces is not used during authentication transactions to prove a person's identity.

A set of times {t_k} may be created from the signed and attested timestamps. The set of times {t_k} represents a set of all the times t_k. "t" represents the time given by a timestamp and "k" represent the position of the time "t" in the set {t_k}. The minimum time min_k in the set {t_k} may be designated min_k {t_k} and the maximum time max_k in the set {t_k} may be designated max_k {t_k}. Thus, the window of time Δt may be calculated as the difference between the maximum time max_k {t_k} and the minimum time min_k {t_k} according to the equation Δt=max_k {t_k}−min_k {t_k}. The window of time Δt is calculated solely from signed and attested timestamps or capture times. As a result, latencies, transmission delays, and jitters of networks, for example, the network 20 do not affect the calculated value of the window of time Δt.

The window of time Δt may be compared against a maximum window of time $\Delta t_{max}$ to determine whether the biometric modality data in the obtained signals was captured contemporaneously. The maximum window of time $\Delta t_{max}$ may be, for example, between thirty (30) and fifty (50) milliseconds. Biometric modality data captured within the maximum window of time $\Delta t_{max}$, is considered to have been captured contemporaneously, for example, during the same authentication transaction. Latencies, transmission delays, and jitters of networks, for example, the network 20 do not affect the calculated value of the window of time Δt, and thus do not affect the comparison of the window of time Δt against the maximum window of time $\Delta t_{max}$.

If the window of time Δt is greater than the maximum window of time $\Delta t_{max}$, the biometric modality data was not captured contemporaneously. As a result, in step S10, the software 44 executed by the processor 22 causes the electronic device 12 to deem the biometric modality data fraudulent. Next, in step S8, the software 44 executed by the processor 22 causes the electronic device 12 to obtain within a window of time from one or more sensors a plurality of signals.

However, when the window of time Δt is less than or equal to the maximum window of time $\Delta t_{max}$, the biometric modality data is deemed to have been captured contemporaneously. It is contemplated by the present disclosure that verification of the electronic signature, freshness of the nonce, and attested status may additionally, or alternatively, be required in step S9 as part of determining whether the biometric modality data was captured contemporaneously. Verification of the electronic signature, freshness of the nonce, and attested status may be done in any manner. When the electronic signature, freshness of the nonce and attested status are verified, the window of time $\Delta t$ may be calculated as described herein. However, when any one of the electronic signature, freshness of the nonce, and attested status fails verification, in step S10, the software 44 executed by the processor 22 causes the electronic device 12 to deem the biometric modality data fraudulent.

After determining the biometric modality data was captured contemporaneously, in step S11, the software 44 executed by the processor 22 causes the electronic device 12 to compute a feature vector for the biometric modality data in each of the plurality of signals. A separate feature vector is computed for the data of each different biometric modality. The software 44 that may be used to compute the feature vectors includes, for example, principal component analysis models and wavelet transforms. The feature vectors may also be normalized.

The electronic device 12 transmits via the network 20 the normalized feature vectors to the quantum computer 18. An example normalized feature vector created from the facial image data may be (0.5, 0.5, 0.5, 0.5), and an example normalized feature vector created from the voice data may be (0.588, 0.392, 0.392, 0.588).

Next, in step S12, the quantum computer 18 encodes the normalized feature vectors into qubits, or quantum states and arranges the qubits into qubit registers. The normalized feature vectors may be encoded into qubits using, for example, amplitude or angle encoding techniques as described herein with regard to FIGS. 12 and 13, respectively, or using an instantaneous-quantum-polynomial (IQP) feature algorithm. The normalized facial feature vector (0.5, 0.5, 0.5, 0.5) may be encoded into, for example, $0.5|00\rangle+0.5|01\rangle+0.5|10\rangle+0.5|11\rangle$ and the normalized voice feature vector may be encoded into, for example, $0.588|00\rangle+0.392|01\rangle+0.392|10\rangle+0.588|11\rangle$.

Next, in step S13, the quantum computer 18 generates a multi-qubit entangled state from the qubit registers. More specifically, the encoded feature vectors are entangled into qubits using entanglement software, or an entanglement circuit, that includes, for example, a Hadamard gate and a controlled NOT (CNOT). The encoded features may be entangled by, for example, applying the Hadamard gate to the qubits created for image data. The controlled NOT (CNOT) gate may be controlled by the image qubits or the audio qubits to generate a multi-qubit state. Multi-qubit states include, but are not limited to, Bell-states and Greenberger-Horne-Zeilinger (GHZ) states.

When the data for a biometric modality is encoded into multiple physical qubits, the Bell-states and/or the GHZ states entangle a designated representative logical qubit per register, for example, the most significant index, or a compressed logical qubit obtained via an isometry.

Entanglement software, or entanglement circuits, may also include, for example, controlled X (CX) gates that may be used to create target entangled states across the qubit or quantum registers that are from the different normalized encoded feature vectors and/or embeddings.

The encoded face and voice feature vectors may be entangled to form, for example, $\rho\approx|\psi\rangle\langle\psi|$, where $\rho$ is a density matrix of a and each $\langle\psi|$ denotes a target entangled pure state determined by the enrolled modalities. The entangled pure state may be, for example, a Bell-state, a GHZ state, a W state, a cluster state, or graph state. Expectation values are calculated as a measure of a quantum observable, for example, a Pauli operator. Readout error correction is applied to measurements of the encoded and entangled feature registers before calculating the expectation values. In step S14, the quantum computer 18 generates an entanglement indicator value for the multi-qubit entangled state and transmits the entanglement indicator value to the electronic device 12 via the network 20. The entanglement indicator value certifies the entanglement. Certification means that the entanglement indicator value exceeds a calibrated attested threshold value by a margin, for example, ¿, ¿' that rules out separable states and thus ensures entanglement. The electronic device 12 may admit the certification only upon verifying a cryptographic attestation of the active configuration.

The entanglement indicator value may be generated, for example, as a stabilizer-based Bell-state fidelity of the entanglement or as a Clauser-Horne-Shimony-Holt (CHSH) parameter S. The Bell-state fidelity can be defined as a function of a density matrix of a multi-qubit state produced by entanglement software, or an entanglement circuit, and a target entangled state. For example, the entanglement fidelity may be defined by the equation $F(\rho,|\psi\rangle)\triangleq\langle\Phi|\rho|\psi\rangle$, where $\rho$ denotes a density matrix of the prepared multi-qubit state and $|\psi\rangle$ denotes the target entangled pure state. The entangled pure state may be, for example, the Bell state, the GHZ state, a witness, cluster, or a graph state. Generally, for arbitrary states $\rho$ and $\sigma$, the Bell-state fidelity may be defined by the equation $F(\rho,\sigma)\triangleq(\mathrm{Tr}\sqrt{(\sqrt{\rho}\sigma\sqrt{\rho})})^2$, which reduces to $\langle\psi|\rho|\psi\rangle$ when $\sigma=|\psi\rangle\langle\psi|$.

Although the entanglement indicator value is described herein as the Bell-state fidelity of the entanglement or as the Clauser-Horne-Shimony-Holt (CHSH) parameter S, it is contemplated by the present disclosure that the entanglement indicator value may alternatively, or additionally, be, for example, an expectation value of an entanglement witness value W that is negative, a multipartite nonlocality statistic selected from Mermin or Svetlichny-type inequalities, or a measurement-device-independent (MDI) statistic.

It is contemplated by the present disclosure that error mitigation software, for example, zero noise extrapolation, Clifford data regression, probabilistic error cancellation, or read-out error correction may be applied to the entangled encoded features before generating the entanglement indicator value.

It is also contemplated by the present disclosure that the quantum computer 18 may encrypt the entanglement indicator value before transmission to the electronic device 12. Such quantum encryption software includes, for example, post quantum cryptography algorithms.

In step S15, the software 44 executed by the processor 22 causes the electronic device 12 to compare the entanglement indicator value against a threshold value. Next, in step S16, the software 44 executed by the processor 22 causes the electronic device 12 to determine whether the entanglement indicator value satisfies the threshold value. If yes, in step S17, the software 44 executed by the processor 22 causes the electronic device 12 to determine the obtained biometric modality data is of a live person. Otherwise, in step S18, the software 44 executed by the processor 22 causes the electronic device 12 to determine that the biometric modality data is likely fraudulent. As a result, secondary authentication is required that includes, but is not limited to, manual review or other contemporary biometric authentication method.

When the entanglement indicator value is the Bell-state fidelity, the threshold value may be satisfied if and only if the Bell-state fidelity is at least equal to the threshold value. When the entanglement indicator value is the CHSH parameter S, the threshold value may be satisfied if and only if the CHSH parameter S is greater than $2+\varepsilon$. When the entanglement indicator value is an expectation value of an entanglement witness value W that is negative, the threshold value may be satisfied if and only if the negative entanglement witness value W is greater than or equal to the threshold value or when the entanglement witness value W is less than or equal to $-\varepsilon'$. $\varepsilon$ and $\varepsilon'$ are calibration-chosen margins per a Shot Budget and Confidence bounds.

For a given shot budget N and confidence level of, for example, ninety-five percent, a margin $\varepsilon$ or $\varepsilon'$ is computed from a standard error (SE) or a concentration bound for the relevant statistic. The relevant statistics include, for example, CHSH parameter S, Bell state fidelity, and expectation value of an entanglement-witness value W that is negative. For CHSH, with N shots per setting, the SE is when the parameter S is less than or equal to 2/N, which yields $\varepsilon = z \cdot 2/N$ with z the normal quantile. For Bell-state fidelity $\hat{F}$, the SE is obtained by error propagation from Pauli expectations. For a linear witness W, the SE is obtained from the weighted sum of Pauli uncertainties. In witness mode the entanglement indicator value is defined as $-\langle W \rangle$ so that larger is more live and requires the entanglement indicator value to be greater than or equal to $\varepsilon'$.

It is contemplated by the present disclosure that in, for example, step S12, the quantum computer 18 may insert decoys probabilistically or randomly into the qubit registers. The decoys may be, for example, decoy qubits and/or decoy shots selected according to randomized policy over register positions, time slots, prepared states, and/or measurement bases. The decoy qubits bind measurements to the event of capturing the biometric modality data.

A decoy mismatch rate can be calculated and compared against a mismatch threshold. A decoy mismatch occurs when a readout-corrected statistic for a decoy deviates from the mismatch threshold. A decoy mismatch is recorded when the readout-corrected statistic, fidelity estimate, or witness value deviates from established criteria by more than an allowed tolerance or falls below a decoy acceptance threshold. As a result of determining the decoy mismatch rate deviates from, or fails to satisfy, the mismatch threshold, the biometric modality data is determined to be fraudulent. The method may continue in step S8, in which the software 44 executed by the processor 22 causes the electronic device 12 to obtain within a window of time from one or more sensors a plurality of signals.

It is contemplated by the present disclosure that the entanglement indicator value may be recalculated and compared against the originally calculated entanglement indicator value. If the recalculated entanglement indicator value is different than the originally calculated entanglement indicator value, the recalculated value is compared against the threshold value. If the recalculated value fails to satisfy the threshold value, the biometric modality data is deemed to be fraudulent and the attested key pair associated with the sensor or sensors that captured the biometric modality data are removed.

The information shown in FIG. 15 includes some of the same information shown in FIG. 14 as described in more detail below. As such, features illustrated in FIG. 15 that are identical to features illustrated in FIG. 14 are identified using the same reference numerals used in FIG. 14.

Figure 15:
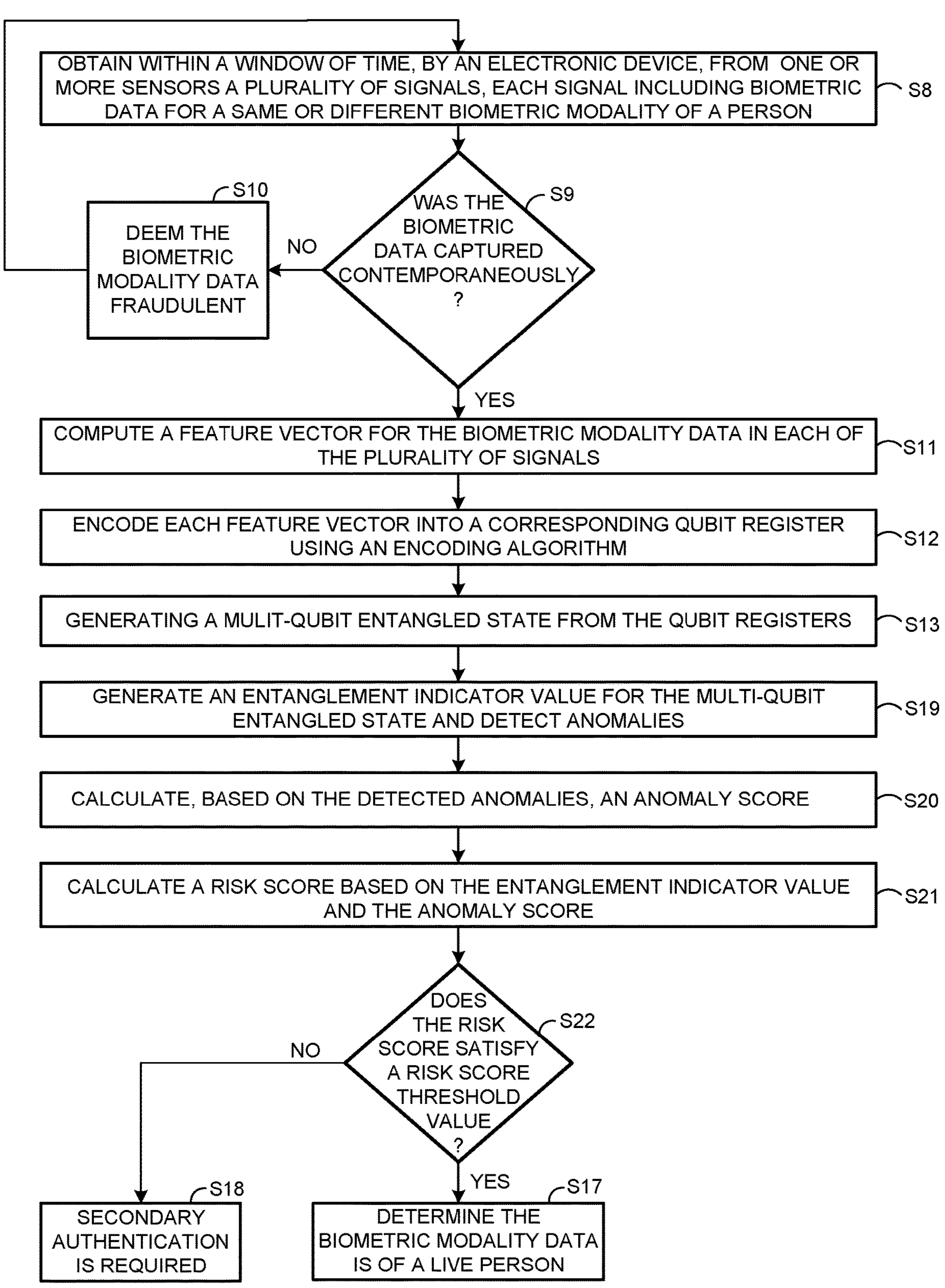
FIG. 15 is a flowchart illustrating an alternative example method and algorithm for enhancing detection of fraudulent authentication data.

FIG. 15 is a flowchart illustrating an alternative example method and algorithm for enhancing detection of fraudulent authentication data during, for example, an authentication transaction. This method is similar to that shown in FIG. 14. This alternative method does not determine whether biometric modality data is of a live person based on a comparison of the entanglement indicator value against the threshold value. Rather, this alternative method determines whether biometric modality data is of a live person based on a risk score.

More specifically, in addition to generating the entanglement indicator value, in step S19, the quantum computer 18 detects anomalies in the biometric modality data. The anomalies may be detected using, for example, Quantum Support Vector Machines (QSVM) or VQC. Using QSVM and VQC software enables enhanced anomaly detection compared against contemporary techniques using non-quantum hardware and software.

In step S20, the quantum computer 18 calculates, based on the detected anomalies, an anomaly score and transmits the anomaly score and entanglement indicator value to the electronic device 12 via the network 20. The anomaly scores reflect the likelihood that the obtained biometric modality data is genuine.

Next, in step S21, the software 42 executed by the processor 22 causes the electronic device 12 to calculate a risk score based on the entanglement indicator value and the anomaly score. The risk score may be calculated, for example, according to the equation $R = w_1 \cdot \sigma(M) + w_2 \cdot \sigma(A)$, where R is the risk score, $\sigma$ is a monotone mapping, $w_1$, $w_2$ are weights, M is the entanglement indicator value, and A is the anomaly score. The monotone mapping $\sigma$ may be, for example, a logistic function $\sigma(x) = 1/(1+e\hat{\ }\{-k \cdot x\})$ or min-max scaling to [0,1]. The weights $w_1$, $w_2$ are selected to satisfy target true positive rate (TPR) and false acceptance rate (FAR) operating points.

In step S22, the software 44 executed by the processor 22 causes the electronic device 12 to determine whether the risk score satisfies a risk score threshold value. The risk score may satisfy the risk score threshold value if the risk score is greater than or equal to the risk score threshold value. If the risk score satisfies the risk score threshold value, in step S17, the software 44 executed by the processor 22 causes the electronic device 12 to determine that the obtained biometric data is of a live person. However, when the risk score fails to satisfy the risk score threshold value, in step S18, the software 44 executed by the processor 22 causes the electronic device 12 to determine that the biometric modality data is likely fraudulent. As a result, secondary authentication is required that includes, but is not limited to, manual review or other contemporary biometric authentication methods.

The information shown in FIG. 16 includes some of the same information shown in FIG. 14 as described in more detail below. As such, features illustrated in FIG. 16 that are identical to features illustrated in FIG. 14 are identified using the same reference numerals used in FIG. 14.

Figure 16:
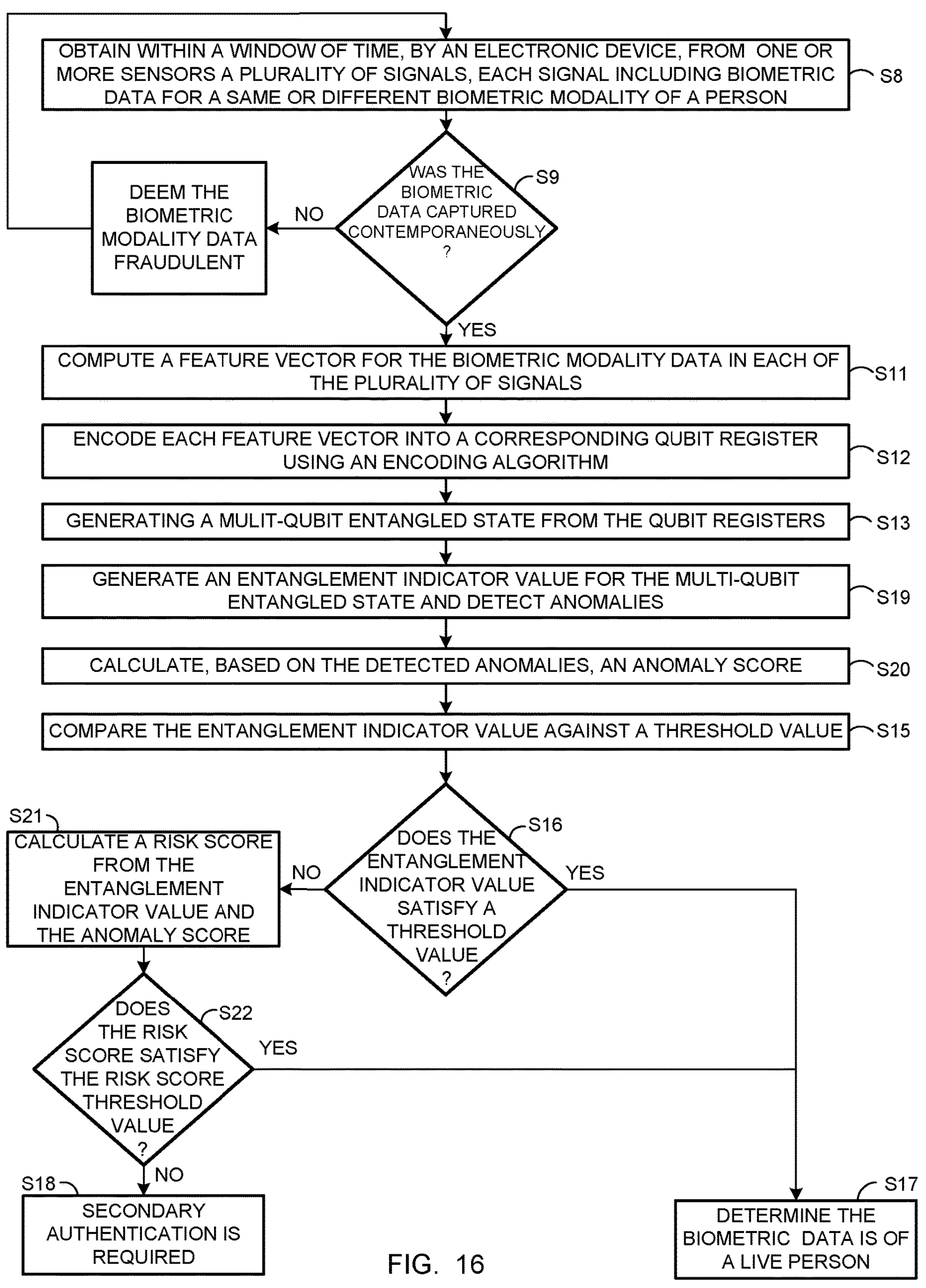
FIG. 16 is a flowchart illustrating another alternative example method and algorithm for enhancing detection of fraudulent authentication data.

FIG. 16 is a flowchart illustrating another alternative example method and algorithm for enhancing the detection of fraudulent authentication data during, for example, an authentication transaction. This method is similar to that shown in FIG. 14. However, this alternative method determines whether biometric modality data is of a live person based on the comparison of the entanglement indicator value against the threshold value as well as a comparison of the risk score against the risk score threshold value.

More specifically, in addition to generating the entanglement indicator value, in step S19, the quantum computer 18 detects anomalies in the biometric modality data. The anomalies may be detected using, for example, Quantum Support Vector Machines (QSVM) or VQC. Using QSVM and VQC software enables enhanced anomaly detection compared against contemporary techniques using non-quantum hardware and software.

In step S20, the quantum computer 18 calculates, based on the detected anomalies, an anomaly score and transmits the anomaly score and entanglement indicator value to the electronic device 12 via the network 20. The anomaly scores reflect the likelihood that the obtained biometric modality data is genuine. It is contemplated by the present disclosure that the quantum computer 18 may encrypt the entanglement indicator value and anomaly score before transmission to the electronic device 12. Such quantum software includes, for example, post quantum cryptography algorithms. Instead of transmitting the anomaly score, the detected anomalies may be transmitted to the electronic device 12 which may calculate the anomaly score.

In step S15, the software 44 executed by the processor 22 causes the electronic device 12 to compare the entanglement indicator value against the threshold value. Next, in step S16, the software 44 executed by the processor 22 causes the electronic device 12 to determine whether the entanglement indicator value satisfies the threshold value. If yes, in step S17, the software 44 executed by the processor 22 causes the electronic device 12 to determine the biometric modality data is of a live person. Otherwise, in step S21, the software 44 executed by the processor 22 causes the electronic device 12 to calculate a risk score based on the entanglement indicator value and the anomaly score. The risk score may be calculated, for example, according to the equation $R=w_1\cdot\sigma(M)+w_2\cdot\sigma(A)$, where R is the risk score, $\sigma$ is a monotone mapping, $w_1$, $w_2$ are weights, M is the entanglement indicator value, and A is the anomaly score.

In step S22, the software 44 executed by the processor 22 causes the electronic device 12 to determine whether the risk score satisfies a risk score threshold value. The risk score may satisfy the risk score threshold value if the risk score is greater than or equal to the risk score threshold value. If the risk score satisfies the risk score threshold value, in step S17, the software 44 executed by the processor 22 causes the electronic device 12 to determine that the obtained biometric data is of a live person. However, when the risk score fails to satisfy the risk score threshold value, in step S18, the software 44 executed by the processor 22 causes the electronic device 12 to determine that the biometric modality data is likely fraudulent. As a result, secondary authentication is required that includes, but is not limited to, manual review or other contemporary biometric authentication methods.

It is contemplated by the present disclosure that when data for a biometric modality is not received from one of a plurality of sensors, an encoding algorithm can map the feature vectors of the available biometric modality data to a qubit register and entangle the encoded feature vectors with a trap/ancilla qubit prepared in a known state, for example, (|0>, |+>). Thus, only available qubit registers are used.

A controlled entangler, for example, a controlled X gate or a controlled Z gate between the qubit register and the trap/ancilla qubit can produce a two-qubit target state. For feature vectors encoded using amplitude or angle encoding, the two-qubit target states are Bell-class while those encoded using Instantaneous Quantum Polynomial (IQP) algorithm are a depth-light entangler. The entanglement indicator value is computed on the two-qubit target and compared against a different threshold value lower than the threshold value. If the entanglement indictor value fails to satisfy the threshold value, the biometric modality data from another one of the sensors is fraudulent. The other sensor is different than the sensor from which biometric modality data was not received.

Although the biometric modalities are audio data and facial image data for the example methods and algorithms described herein, it is contemplated by the present disclosure that in other embodiments data for more than two biometric modalities may alternatively be captured, for example, data for the voice, facial image, and iris data of a person.

In such embodiments, in steps S13, S14 and/or S19 the entanglement software or circuit of the quantum computer 18 may prepare a Greenberger-Horne-Zeilinger (GHZ) type state over, for example, registers designated as q1, q2, and q3. The GHZ state can be, for example, $|GHZ\rangle=(|000\rangle+|111\rangle)/\sqrt{2})$. The entanglement indicator value may be from a multipartite inequality, for example, a Mermin or Svetlichny inequality. As part of the Mermin type inequality, a three-party test is conducted in which A, A', B, B' and C, C' denote local observables, for example, Pauli axes.

The entanglement indictor value may be calculated as $\langle ABC'\rangle+\langle AB'C\rangle+\langle A'BC\rangle-\langle A'B'C'\rangle$ which is formed from readout-corrected expectations and, under local realistic models, is bounded by $|\text{Entanglement Indicator Value}|\leq 2$. Multipartite entanglement is certified when Entanglement Indicator Value $>2+\varepsilon$ for a calibrated margin $\varepsilon$ set from the shot budget and confidence level. Error mitigation, for example, zero noise extrapolation may be applied prior to calculating the entanglement indicator value. All other subsequent steps are performed in accordance with the methods and algorithms described herein.

It is contemplated by the present disclosure that the synergy between non-quantum and quantum computing enables sub-second or near-real-time liveness detection. Although current NISQ hardware may introduce overhead for data encoding and qubit measurement, the combination of non-quantum and quantum computing described herein facilitates maintaining low-latency performance by leveraging fast non-quantum pre-processing and error-mitigation techniques that minimize the duration of quantum operations. For example, in high-throughput environments such as border checkpoints or financial transactions, the methods described herein with regard to FIGS. 14, 15, and 16 may be executed in under a few seconds, effectively blocking fraudulent attempts without noticeable delay. As quantum gate fidelities and qubit counts continue to improve, latencies resulting from performing steps of the example methods on the quantum computer 18 will further decrease, causing instantaneous or near-instantaneous accurate and trustworthy authentication transaction results.

Using the methods and algorithms for enhancing detection of fraudulent authentication data described herein facilitates seamlessly combining the capabilities of quantum computing and non-quantum computing to enhance the detection of deep fakes and seemingly valid, noise-injected quantum states to guard against spoofing attacks launched against, for example, military field operations, zero-trust cloud login environments, and highly regulated industries. As a result, limitations of purely non-quantum computing techniques are facilitated to be overcome and the accuracy and trustworthiness of authentication transactions and fraud detection results are facilitated to be enhanced.

Additionally, or alternatively, if the signature on a tuple is invalid, the nonce is stale, or the sensor clocks are unattested, the obtained biometric modality data may be deemed fraudulent and thus rejected. Because clocks internal to the sensors are used to determine the capture times, latencies inherent to networks, for example, the network 20 do not affect the calculation of the window of time $\Delta t$. It is contemplated by the present disclosure that the sensors periodically re-attest to maintain trust in clock timing. The capture times, or timestamps, generated by each sensor only increase relative to previous capture times of the respective sensors.

It is contemplated by the present disclosure that the example methods and algorithms described herein may be conducted entirely by the electronic device 12; partly by the electronic device 12 and partly by the quantum computer 16; entirely by the quantum computer 16, or by any other combination of other servers (not shown), electronic devices (not shown), or computers (not shown) operable to communicate with the electronic device 12 and the quantum computer 16 via the network 18. Furthermore, data described herein as being stored in the electronic device 12 may alternatively, or additionally, be stored in any other server (not shown), electronic device (not shown), or computer (not shown) operable to communicate with the electronic device 12 via the network 18.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method for enhancing detection of fraudulent authentication data comprising the steps of:

obtaining within a window of time, by an electronic device, from one or more sensors a plurality of signals, each signal including data for a same or different biometric modality of a person, each of the one or more sensors being associated with an attested device key pair;

obtaining an electronically signed tuple from each of the one or more sensors, the electronically signed tuple including a nonce, an electronic signature, and a time the one signal was captured, wherein the capture times generated by each of the sensors only increase relative to previous capture times generated by the respective sensor;

verifying the electronic signature, freshness of the nonce, and the attested status of a time base of each of the one or more sensors;

when the electronic signature, freshness of the nonce, and attested statuses are verified, calculating, from the captured times, a maximum capture time and a minimum capture time, the window of time being the difference between the maximum and minimum times; and determining the obtained biometric modality data is fraudulent when the window of time exceeds a calibrated maximum duration.

2. The method according to claim 1, further comprising determining the obtained biometric modality data is fraudulent when the electronic signature, freshness of the nonce, or the attested status for any one of the one or more sensors fail to be verified.

3. The method according to claim 2, wherein the window of time is independent of latencies of the network.

4. The method according to claim 1, wherein the attested device key pair for each sensor is the same or different.

5. The method according to claim 1, wherein the time is bound to the attested device key pair of the respective sensor.

6. The method according to claim 1, wherein the biometric modality data comprises:

data for different biometric modalities;

data for the same biometric modality captured at different times within the window of time, wherein the capture times generated by each of the sensors only increase relative to previous capture times generated by the respective sensor; or data for the same biometric modality obtained via different sensors.

7. The method according to claim 1, further comprising calculating the window of time according to the equation $\Delta t = \max\_k\ \{t\_k\} - \min\_k\ \{t\_k\}$, where:

$\Delta t$ represents a duration of the window of time;

t_k represents the time a signal was captured, wherein the capture times generated by each of the sensors only increase relative to previous capture times generated by the respective sensor;

{t_k} represents a set of all t_k;

max_k represents the maximum time t_k in the set {t_k}; and min_k represents the minimum time t_k in the set {t_k}.

8. An electronic device for enhancing detection of fraudulent authentication data comprising:

a processor; and a memory configured to store data, said electronic device being associated with a network and said memory being in communication with said processor and having instructions stored thereon which, when read and executed by said processor, cause said electronic device to:

obtain within a window of time from one or more sensors a plurality of signals, each signal including data for a same or different biometric modality of a person, each of the one or more sensors being associated with an attested device key pair;

obtain an electronically signed tuple from each of the one or more sensors, the electronically signed tuple including a nonce, an electronic signature, and a time the one signal was captured, wherein the capture times generated by each of the sensors only increase relative to previous capture times generated by the respective sensor;

verify the electronic signature, freshness of the nonce, and the attested status of a time base of each of the one or more sensors;

when the electronic signature, freshness of the nonce, and attested statuses are verified, calculate, from the captured times, a maximum capture time and a minimum capture time, the window of time being the difference between the maximum and minimum times; and determine the obtained biometric modality data is fraudulent when the window of time exceeds a calibrated maximum duration.

9. The electronic device according to claim 8, wherein the instructions when read and executed by said processor, cause said electronic device to determine the obtained biometric modality data is fraudulent when the electronic signature, freshness of the nonce, or the attested status for any one of the one or more sensors fail to be verified.

10. The electronic device according to claim 8, wherein the window of time is independent of latencies of the network.

11. The electronic device according to claim 8, wherein the attested device key pair for each sensor is the same or different.

12. The electronic device according to claim 8, wherein the time is bound to the attested device key pair of the respective sensor.

13. The electronic device according to claim 8, wherein the biometric modality data comprises:

data for different biometric modalities;

data for the same biometric modality captured at different times within the window of time, wherein the capture times generated by each of the sensors only increase relative to previous capture times generated by the respective sensor; or data for the same biometric modality obtained via different sensors.

14. The electronic device according to claim 8, wherein the instructions when read and executed by said processor, cause said electronic device to:

calculate the window of time according to the equation Δt=max_k {t_k}−min_k {t_k}, where Δt represents a duration of the window of time, t_k represents the time a signal was captured, wherein the capture times generated by each of the sensors only increase relative to previous capture times generated by the respective sensor;

{t_k} represents a set of all t_k, max_k represents the maximum time t_k in the set {t_k}, and min_k represents the minimum time t_k in the set {t_k}.

15. A non-transitory computer-readable recording medium in an electronic device for enhancing detection of fraudulent authentication data, the non-transitory computer-readable recording medium storing instructions which when executed by a hardware processor cause the hardware processor to perform steps comprising:

obtaining within a window of time from one or more sensors a plurality of signals, each signal including data for a same or different biometric modality of a person, each of the one or more sensors being associated with an attested device key pair;

obtaining an electronically signed tuple from each of the one or more sensors, the electronically signed tuple including a nonce, an electronic signature, and a time the one signal was captured, wherein the capture times generated by each of the sensors only increase relative to previous capture times generated by the respective sensor;

verifying the electronic signature, freshness of the nonce, and the attested status of a time base of each of the one or more sensors;

when the electronic signature, freshness of the nonce, and attested statuses are verified, calculating, from the captured times, a maximum capture time and a minimum capture time, the window of time being the difference between the maximum and minimum times; and determining the obtained biometric modality data is fraudulent when the window of time exceeds a calibrated maximum duration.

16. A non-transitory computer-readable recording medium according to claim 15, wherein the instructions when read and executed by said processor cause said hardware processor to perform a step comprising determining the obtained biometric modality data is fraudulent when the electronic signature, freshness of the nonce, or the attested status for any one of the one or more sensors fail to be verified.

17. A non-transitory computer-readable recording medium according to claim 15, wherein the time is bound to the attested device key pair of the respective sensor.

* * * * *